(12) United States Patent
Tanaka

(10) Patent No.: US 12,481,937 B2
(45) Date of Patent: Nov. 25, 2025

(54) RUN EFFICIENCY MEASURING SYSTEM, A VEHICLE AND A CERTIFICATE

(71) Applicant: Masahide Tanaka, Osaka (JP)

(72) Inventor: Masahide Tanaka, Osaka (JP)

(73) Assignee: NL GIKEN INCORPORATED, Osaka (JP)

( * ) Notice: Subject to any disclaimer, the term of this patent is extended or adjusted under 35 U.S.C. 154(b) by 648 days.

(21) Appl. No.: 17/528,274

(22) Filed: Nov. 17, 2021

(65) Prior Publication Data

US 2022/0076175 A1 Mar. 10, 2022

Related U.S. Application Data

(63) Continuation of application No. 16/724,377, filed on Dec. 22, 2019, now abandoned, which is a continuation of application No. 15/810,152, filed on Nov. 13, 2017, now abandoned, which is a continuation of application No. 12/814,452, filed on Jun. 12, 2010, now abandoned.

(30) Foreign Application Priority Data

Jun. 18, 2009 (JP) .................................. 2009-145887

(51) Int. Cl.
  *G06Q 10/06* (2023.01)
  *G06Q 20/10* (2012.01)
  *G06Q 20/40* (2012.01)

(52) U.S. Cl.
  CPC ............. *G06Q 10/06* (2013.01); *G06Q 20/10* (2013.01); *G06Q 20/40* (2013.01)

(58) Field of Classification Search
  CPC ............................. G06Q 20/042; G06Q 40/02
  See application file for complete search history.

(56) References Cited

U.S. PATENT DOCUMENTS 5,590,038 A * 12/1996 Pitroda .............. G06Q 20/4093
                                                                705/41
6,705,520 B1 * 3/2004 Pitroda ................ G07G 1/0018
                                                                235/382.5

(Continued)

FOREIGN PATENT DOCUMENTS

| CN | 202217324 U | * | 5/2012 | ............. G07B 15/06 |
| CN | 119741106 A | * | 4/2025 | |
| EP | 0393660 | * | 2/1994 | |

*Primary Examiner* — Daniel S Felten

(57) ABSTRACT

A run efficiency measuring system measures both investment into a vehicle for run and actual run performance by the vehicle. The investment means cost of energy, toll, and budgeted time, while the actual run performance means travel distance and saved time. Run efficiency is calculated on the measurements separately by difference in driver, between toll run and free run, and in unit price of energy. The measurement is summarized every time when one of the differences occurs, or day changes, or predetermined travel distance has been run. Vehicle is in wireless communication with IC card type certificate integrated with credit card which is inserted into card slot of the vehicle to identify driver for the individual run efficiency calculation, authentication as qualified driver, and ETC payment. Run efficiency data gotten in a vehicle can be taken over to next different vehicle for accumulation by way of memory of the certificate.

13 Claims, 17 Drawing Sheets

(56) References Cited

U.S. PATENT DOCUMENTS

| | | | | |
|---|---|---|---|---|
| 7,975,910 B2* | 7/2011 | Artino | .................... | G07F 19/20 |
| | | | | 902/8 |
| 8,474,702 B2* | 7/2013 | Smith | ................... | G07F 19/206 |
| | | | | 235/379 |
| 8,527,407 B1* | 9/2013 | Yadav-Ranjan | ....... | G06Q 40/03 |
| | | | | 705/40 |
| 8,620,807 B2* | 12/2013 | Meier | .................... | G06Q 30/04 |
| | | | | 705/40 |
| 8,630,947 B1* | 1/2014 | Freund | ................. | G06Q 40/02 |
| | | | | 705/40 |
| 8,714,336 B2* | 5/2014 | Csulits | .................. | G07D 11/50 |
| | | | | 382/140 |
| 8,732,082 B2* | 5/2014 | Karim | ................ | G06Q 20/1085 |
| | | | | 705/40 |
| 9,251,510 B2* | 2/2016 | Dickelman | .......... | G06Q 20/027 |
| 9,355,295 B1* | 5/2016 | Jones | ................... | G06V 10/143 |
| 9,367,980 B2* | 6/2016 | Graef | ................ | G07D 11/0096 |
| 2002/0138425 A1* | 9/2002 | Shimizu | ................. | G06Q 20/10 |
| | | | | 705/40 |
| 2003/0115126 A1* | 6/2003 | Pitroda | ................. | G06Q 20/20 |
| | | | | 705/36 R |
| 2003/0208443 A1* | 11/2003 | Mersky | ................ | G06Q 30/02 |
| | | | | 705/40 |
| 2008/0086412 A1* | 4/2008 | Randazza | .............. | G06Q 20/26 |
| | | | | 705/17 |
| 2014/0164226 A1* | 6/2014 | Gorodish | ........... | G06Q 30/0213 |
| | | | | 705/39 |
| 2014/0324687 A1* | 10/2014 | Lovelett | ............... | G06Q 20/102 |
| | | | | 705/40 |
| 2016/0253639 A1* | 9/2016 | Sharma | ............... | G06Q 20/102 |
| | | | | 705/40 |

* cited by examiner

| Car ID | Data | Cert. ID | Date | Price | Flow | Toll/10km | Run | Time | Cost·Time |
|---|---|---|---|---|---|---|---|---|---|
| 17 | 1 | 123 | 6/28 | 120 | 10.00 | 0 | 100 | 2.00 | 120 |
| 17 | 2 | 456 | 6/28 | 120 | 12.00 | 0 | 100 | 3.00 | 216 |
| 17 | 3 | 123 | 6/28 | 120 | 6.00 | 0 | 100 | 1.00 | 36 |
| 17 | 4 | 123 | 6/28 | 120 | 6.00 | 200 | 100 | 1.00 | 136 |
| 17 | 5 | 123 | 6/28 | 100 | 6.00 | 200 | 100 | 1.00 | 130 |
| 17 | 6 | 123 | 6/28 | 100 | 3.48 | 200 | 58 | 0.58 | 130 |
| 17 | 7 | 123 | 6/28 | 100 | 0.70 | 200 | 10 | 0.08 | 108 |
| 17 | 8 | 123 | 6/28 | 100 | 0.55 | 200 | 10 | 0.11 | 140 |
| 17 | 9 | 123 | 6/28 | 100 | 0.65 | 200 | 10 | 0.09 | 119 |
| 17 | 10 | 123 | 6/28 | 100 | 0.65 | 200 | 10 | 0.10 | 133 |
| 17 | 11 | 123 | 6/28 | 100 | 0.40 | 200 | 7 | 0.08 | 147 |
| 17 | 12 | 123 | 6/29 | 100 | 1.00 | 0 | 10 | 0.20 | 100 |
| 17 | 13 | 123 | 6/29 | 100 | 0.35 | 0 | 3 | 0.10 | 194 |
| 17 | 14 | 123 | 7/1 | 100 | 2.50 | 0 | 24 | 0.60 | 130 |
| 17 | 15 | 123 | 7/1 | 100 | 18.50 | 180 | 330 | 3.00 | 107 |
| 17 | 16 | 123 | 7/1 | 100 | 2.50 | 0 | 23 | 0.70 | 165 |
| 17 | 17 | 123 | 7/1 | 100 | 8.50 | 250 | 146 | 1.40 | 148 |
| 17 | 18 | 123 | 7/1 | 100 | 1.50 | 0 | 14 | 0.34 | 130 |
| 17 | 19 | 456 | 7/2 | 100 | 1.30 | 0 | 10 | 0.31 | 202 |
| 17 | 20 | 456 | 7/2 | 115 | 9.20 | 0 | 65 | 1.67 | 209 |
| 17 | 21 | 456 | 7/2 | 115 | 0.70 | 300 | 10 | 0.08 | 152 |
| 17 | 22 | 456 | 7/2 | 115 | 0.55 | 300 | 8 | 0.07 | 166 |
| 17 | 23 | 456 | 7/4 | 115 | 1.25 | 0 | 10 | 0.32 | 230 |
| 17 | 24 | — | 7/5 | 115 | 5.25 | 0 | 60 | 1.45 | 122 |
| 17 | 25 | — | 7/5 | 115 | 18.30 | 150 | 390 | 4.27 | 112 |
| 17 | 26 | — | 7/5 | 115 | 6.30 | 200 | 127 | 1.38 | 140 |
| 17 | 27 | — | 7/5 | 115 | 2.10 | 0 | 26 | 0.57 | 102 |
| 17 | 28 | 123 | 7/9 | 115 | 5.10 | 0 | 58 | 1.45 | 126 |
| 17 | 29 | 456 | 7/10 | 120 | 0.60 | 0 | 5 | 0.14 | 202 |
| 17 | 30 | 456 | 7/11 | 120 | 4.10 | 0 | 36 | 1.10 | 209 |
| 17 | Total/Run Weighted Ave. | | | | 136.03 | | 1,960 | 28.19 | 129 |

Fig. 3

| Data | Price | Flow | Toll/10km | Run | Time | Cost·Time | Cost | Fuel Cost | Speed |
|---|---|---|---|---|---|---|---|---|---|
| 1 | 120 | 10.00 | 0 | 100 | 2.00 | 120 | 120 | 10.0 | 50.0 |
| 2 | 120 | 12.00 | 0 | 100 | 3.00 | 216 | 144 | 8.3 | 33.3 |
| 3 | 120 | 6.00 | 0 | 100 | 1.00 | 36 | 72 | 16.7 | 100.0 |
| 4 | 120 | 6.00 | 200 | 100 | 1.00 | 136 | 272 | 16.7 | 100.0 |
| 5 | 100 | 6.00 | 200 | 100 | 1.00 | 130 | 260 | 16.7 | 100.0 |
| 6 | 100 | 3.48 | 200 | 58 | 0.58 | 130 | 260 | 16.7 | 100.0 |
| 7 | 100 | 0.70 | 200 | 10 | 0.08 | 108 | 270 | 14.3 | 125.0 |
| 8 | 100 | 0.55 | 200 | 10 | 0.11 | 140 | 255 | 18.2 | 90.9 |
| 9 | 100 | 0.65 | 200 | 10 | 0.09 | 119 | 265 | 15.4 | 111.1 |
| 10 | 100 | 0.65 | 200 | 10 | 0.10 | 133 | 265 | 15.4 | 100.0 |
| 11 | 100 | 0.40 | 200 | 7 | 0.08 | 147 | 257 | 17.5 | 87.5 |
| 12 | 100 | 1.00 | 0 | 10 | 0.20 | 100 | 100 | 10.0 | 50.0 |
| 13 | 100 | 0.35 | 0 | 3 | 0.10 | 194 | 117 | 8.6 | 30.0 |
| 14 | 100 | 2.50 | 0 | 24 | 0.60 | 130 | 104 | 9.6 | 40.0 |
| 15 | 100 | 18.50 | 180 | 330 | 3.00 | 107 | 236 | 17.8 | 110.0 |
| 16 | 100 | 2.50 | 0 | 23 | 0.70 | 165 | 109 | 9.2 | 32.9 |
| 17 | 100 | 8.50 | 250 | 146 | 1.40 | 148 | 308 | 17.2 | 104.3 |
| 18 | 100 | 1.50 | 0 | 14 | 0.34 | 130 | 107 | 9.3 | 41.2 |
| 19 | 100 | 1.30 | 0 | 10 | 0.31 | 202 | 130 | 7.7 | 32.3 |
| 20 | 115 | 9.20 | 0 | 65 | 1.67 | 209 | 163 | 7.1 | 38.9 |
| 21 | 115 | 0.70 | 300 | 10 | 0.08 | 152 | 381 | 14.3 | 125.0 |
| 22 | 115 | 0.55 | 300 | 8 | 0.07 | 166 | 379 | 14.5 | 114.3 |
| 23 | 115 | 1.25 | 0 | 10 | 0.32 | 230 | 144 | 8.0 | 31.3 |
| 24 | 115 | 5.25 | 0 | 60 | 1.45 | 122 | 101 | 11.4 | 41.4 |
| 25 | 115 | 18.30 | 150 | 390 | 4.27 | 112 | 204 | 21.3 | 91.3 |
| 26 | 115 | 6.30 | 200 | 127 | 1.38 | 140 | 257 | 20.2 | 92.0 |
| 27 | 115 | 2.10 | 0 | 26 | 0.57 | 102 | 93 | 12.4 | 45.6 |
| 28 | 115 | 5.10 | 0 | 58 | 1.45 | 126 | 101 | 11.4 | 40.0 |
| 29 | 120 | 0.60 | 0 | 5 | 0.14 | 202 | 144 | 8.3 | 35.7 |
| 30 | 120 | 4.10 | 0 | 36 | 1.10 | 209 | 137 | 8.8 | 32.7 |
| Total/Ave. | | 136.03 | | 1,960 | 28.19 | 129 | 203 | 14.4 | 69.5 |

Fig. 4

Extraction of all Toll Free Run Data

| Data | Price | Flow | Toll/10km | Run | Time | Cost·Time | Cost | Fuel Cost | Speed |
|---|---|---|---|---|---|---|---|---|---|
| 1 | 120 | 10.00 | 0 | 100 | 2.00 | 120 | *120* | *10.0* | *50.0* |
| 2 | 120 | 12.00 | 0 | 100 | 3.00 | 216 | *144* | *8.3* | *33.3* |
| 3 | 120 | 6.00 | 0 | 100 | 1.00 | 36 | *72* | *16.7* | *100.0* |
| 12 | 100 | 1.00 | 0 | 10 | 0.20 | 100 | *100* | *10.0* | *50.0* |
| 13 | 100 | 0.35 | 0 | 3 | 0.10 | 194 | *117* | *8.6* | *30.0* |
| 14 | 100 | 2.50 | 0 | 24 | 0.60 | 130 | *104* | *9.6* | *40.0* |
| 16 | 100 | 2.50 | 0 | 23 | 0.70 | 165 | *109* | *9.2* | *32.9* |
| 18 | 100 | 1.50 | 0 | 14 | 0.34 | 130 | *107* | *9.3* | *41.2* |
| 19 | 100 | 1.30 | 0 | 10 | 0.31 | 202 | *130* | *7.7* | *32.3* |
| 20 | 115 | 9.20 | 0 | 65 | 1.67 | 209 | *163* | *7.1* | *38.9* |
| 23 | 115 | 1.25 | 0 | 10 | 0.32 | 230 | *144* | *8.0* | *31.3* |
| 24 | 115 | 5.25 | 0 | 60 | 1.45 | 122 | *101* | *11.4* | *41.4* |
| 27 | 115 | 2.10 | 0 | 26 | 0.57 | 102 | *93* | *12.4* | *45.6* |
| 28 | 115 | 5.10 | 0 | 58 | 1.45 | 126 | *101* | *11.4* | *40.0* |
| 29 | 120 | 0.60 | 0 | 5 | 0.14 | 202 | *144* | *8.3* | *35.7* |
| 30 | 120 | 4.10 | 0 | 36 | 1.10 | 209 | *137* | *8.8* | *32.7* |
| Total/Ave. | | 64.75 | | 644 | 14.95 | 142 | *116* | *9.9* | *43.1* |

Fig. 5

Extraction of all Toll Road Run Data

| Data | Price | Flow | Toll/10km | Run | Time | Cost·Time | Cost | Fuel Cost | Speed |
|---|---|---|---|---|---|---|---|---|---|
| 4 | 120 | 6.00 | 200 | 100 | 1.00 | 136 | *272* | *16.7* | *100.0* |
| 5 | 100 | 6.00 | 200 | 100 | 1.00 | 130 | *260* | *16.7* | *100.0* |
| 6 | 100 | 3.48 | 200 | 58 | 0.58 | 130 | *260* | *16.7* | *100.0* |
| 7 | 100 | 0.70 | 200 | 10 | 0.08 | 108 | *270* | *14.3* | *125.0* |
| 8 | 100 | 0.55 | 200 | 10 | 0.11 | 140 | *255* | *18.2* | *90.9* |
| 9 | 100 | 0.65 | 200 | 10 | 0.09 | 119 | *265* | *15.4* | *111.1* |
| 10 | 100 | 0.65 | 200 | 10 | 0.10 | 133 | *265* | *15.4* | *100.0* |
| 11 | 100 | 0.40 | 200 | 7 | 0.08 | 147 | *257* | *17.5* | *87.5* |
| 15 | 100 | 18.50 | 180 | 330 | 3.00 | 107 | *236* | *17.8* | *110.0* |
| 17 | 100 | 8.50 | 250 | 146 | 1.40 | 148 | *308* | *17.2* | *104.3* |
| 21 | 115 | 0.70 | 300 | 10 | 0.08 | 152 | *381* | *14.3* | *125.0* |
| 22 | 115 | 0.55 | 300 | 8 | 0.07 | 166 | *379* | *14.5* | *114.3* |
| 25 | 115 | 18.30 | 150 | 390 | 4.27 | 112 | *204* | *21.3* | *91.3* |
| 26 | 115 | 6.30 | 200 | 127 | 1.38 | 140 | *257* | *20.2* | *92.0* |
| Total/Ave. | | 71.28 | | 1,316 | 13.24 | 123 | *245* | *18.5* | *99.4* |

Fig. 6

(A) Extraction of Data with Certificate ID, "123"

| Data | Price | Flow | Toll/10km | Run | Time | Cost·Time | Cost | Fuel Cost | Speed |
|---|---|---|---|---|---|---|---|---|---|
| 1 | 120 | 10.00 | 0 | 100 | 2.00 | 120 | *120* | *10.0* | *50.0* |
| 3 | 120 | 6.00 | 0 | 100 | 1.00 | 36 | *72* | *16.7* | *100.0* |
| 4 | 120 | 6.00 | 200 | 100 | 1.00 | 136 | *272* | *16.7* | *100.0* |
| 5 | 100 | 6.00 | 200 | 100 | 1.00 | 130 | *260* | *16.7* | *100.0* |
| 6 | 100 | 3.48 | 200 | 58 | 0.58 | 130 | *260* | *16.7* | *100.0* |
| 7 | 100 | 0.70 | 200 | 10 | 0.08 | 108 | *270* | *14.3* | *125.0* |
| 8 | 100 | 0.55 | 200 | 10 | 0.11 | 140 | *255* | *18.2* | *90.9* |
| 9 | 100 | 0.65 | 200 | 10 | 0.09 | 119 | *265* | *15.4* | *111.1* |
| 10 | 100 | 0.65 | 200 | 10 | 0.10 | 133 | *265* | *15.4* | *100.0* |
| 11 | 100 | 0.40 | 200 | 7 | 0.08 | 147 | *257* | *17.5* | *87.5* |
| 12 | 100 | 1.00 | 0 | 10 | 0.20 | 100 | *100* | *10.0* | *50.0* |
| 13 | 100 | 0.35 | 0 | 3 | 0.10 | 194 | *117* | *8.6* | *30.0* |
| 14 | 100 | 2.50 | 0 | 24 | 0.60 | 130 | *104* | *9.6* | *40.0* |
| 15 | 100 | 18.50 | 180 | 330 | 3.00 | 107 | *236* | *17.8* | *110.0* |
| 16 | 100 | 2.50 | 0 | 23 | 0.70 | 165 | *109* | *9.2* | *32.9* |
| 17 | 100 | 8.50 | 250 | 146 | 1.40 | 148 | *308* | *17.2* | *104.3* |
| 18 | 100 | 1.50 | 0 | 14 | 0.34 | 130 | *107* | *9.3* | *41.2* |
| 28 | 115 | 5.10 | 0 | 58 | 1.45 | 126 | *101* | *11.4* | *40.0* |
| Total/Ave. | | 74.38 | | 1,113 | 13.83 | 117 | *212* | *15.0* | *80.5* |

(B) Extraction of Data with Certificate ID, 456

| Data | Price | Flow | Toll/10km | Run | Time | Cost·Time | Cost | Fuel Cost | Speed |
|---|---|---|---|---|---|---|---|---|---|
| 2 | 120 | 12.00 | 0 | 100 | 3.00 | 216 | *144* | *8.3* | *33.3* |
| 19 | 100 | 1.30 | 0 | 10 | 0.31 | 202 | *130* | *7.7* | *32.3* |
| 20 | 115 | 9.20 | 0 | 65 | 1.67 | 209 | *163* | *7.1* | *38.9* |
| 21 | 115 | 0.70 | 300 | 10 | 0.08 | 152 | *381* | *14.3* | *125.0* |
| 22 | 115 | 0.55 | 300 | 8 | 0.07 | 166 | *379* | *14.5* | *114.3* |
| 23 | 115 | 1.25 | 0 | 10 | 0.32 | 230 | *144* | *8.0* | *31.3* |
| 29 | 120 | 0.60 | 0 | 5 | 0.14 | 202 | *144* | *8.3* | *35.7* |
| 30 | 120 | 4.10 | 0 | 36 | 1.10 | 209 | *137* | *8.8* | *32.7* |
| Total/Ave. | | 29.70 | | 244 | 6.69 | 209 | *165* | *8.2* | *36.5* |

Fig. 7

(A) Extraction of Toll Free Run Data for Certificate ID, "123"

| Data | Price | Flow | Toll/10km | Run | Time | Cost·Time | Cost | Fuel Cost | Speed |
|---|---|---|---|---|---|---|---|---|---|
| 1 | 120 | 10.00 | 0 | 100 | 2.00 | 120 | 120 | 10.0 | 50.0 |
| 3 | 120 | 6.00 | 0 | 100 | 1.00 | 36 | 72 | 16.7 | 100.0 |
| 12 | 100 | 1.00 | 0 | 10 | 0.20 | 100 | 100 | 10.0 | 50.0 |
| 13 | 100 | 0.35 | 0 | 3 | 0.10 | 194 | 117 | 8.6 | 30.0 |
| 14 | 100 | 2.50 | 0 | 24 | 0.60 | 130 | 104 | 9.6 | 40.0 |
| 16 | 100 | 2.50 | 0 | 23 | 0.70 | 165 | 109 | 9.2 | 32.9 |
| 18 | 100 | 1.50 | 0 | 14 | 0.34 | 130 | 107 | 9.3 | 41.2 |
| 28 | 115 | 5.10 | 0 | 58 | 1.45 | 126 | 101 | 11.4 | 40.0 |
| Total/Ave. | | 28.95 | | 332 | 6.39 | 100 | 99 | 11.5 | 52.0 |

(B) Extraction of Toll Road Run Data for Certificate ID, "123"

| Data | Price | Flow | Toll/10km | Run | Time | Cost·Time | Cost | Fuel Cost | Speed |
|---|---|---|---|---|---|---|---|---|---|
| 4 | 120 | 6.00 | 200 | 100 | 1.00 | 136 | 272 | 16.7 | 100.0 |
| 5 | 100 | 6.00 | 200 | 100 | 1.00 | 130 | 260 | 16.7 | 100.0 |
| 6 | 100 | 3.48 | 200 | 58 | 0.58 | 130 | 260 | 16.7 | 100.0 |
| 7 | 100 | 0.70 | 200 | 10 | 0.08 | 108 | 270 | 14.3 | 125.0 |
| 8 | 100 | 0.55 | 200 | 10 | 0.11 | 140 | 255 | 18.2 | 90.9 |
| 9 | 100 | 0.65 | 200 | 10 | 0.09 | 119 | 265 | 15.4 | 111.1 |
| 10 | 100 | 0.65 | 200 | 10 | 0.10 | 133 | 265 | 15.4 | 100.0 |
| 11 | 100 | 0.40 | 200 | 7 | 0.08 | 147 | 257 | 17.5 | 87.5 |
| 15 | 100 | 18.50 | 180 | 330 | 3.00 | 107 | 236 | 17.8 | 110.0 |
| 17 | 100 | 8.50 | 250 | 146 | 1.40 | 148 | 308 | 17.2 | 104.3 |
| Total/Ave. | | 45.43 | | 781 | 7.44 | 124 | 261 | 17.2 | 105.0 |

Fig. 8

RUN EFFICIENCY MEASURING SYSTEM, A VEHICLE AND A CERTIFICATE

CROSS REFERENCE TO RELATED APPLICATION

This application is a Continuation Application of U.S. application Ser. No. 16/724,377 filed Dec. 22, 2019, which is a Continuation Application of U.S. application Ser. No. 15/810,152 filed Nov. 13, 2017, which is a Continuation Application of U.S. application Ser. No. 12/814,452 filed Jun. 12, 2010, herein incorporated by reference in its entirety.

BACKGROUND OF THE INVENTION

1. Field of the Invention

This invention relates to a vehicle system, such as gasoline car, electric car and so called hybrid car.

2. Description of the Related Art

In this field of art, various proposals have been done to provide useful information for the driver to run. An example of such information is "Mileage" defined by mile/gallon or similar fuel cost defined by kilometer/liter or the like. With respect to "Mileage" or the like, a fuel cost meter for providing information of flash or instantaneous fuel cost on the base of current fuel flow injected into gasoline engine and the measured current travel distance has been in practical use. Japanese Laid-open Patent Application 1998-115249 proposes one of various improvements relating to such a flash or instantaneous fuel cost meter, in which it is notified that the indication of the flash or instantaneous fuel cost is in error if a rest of the fuel flow injection is detected.

However, there still remains a demand in this field of art to improve the vehicle system including communication system between vehicle and driver.

SUMMARY OF THE INVENTION

An object of this invention is to provide a vehicle system in which exchange of useful information is capable between vehicle and driver.

Another object of this invention is to provide a run efficiency measuring system for a vehicle capable of informing the driver of the measured run efficiency.

Still another object of this invention is to provide a vehicle capable of communication with a certificate kept by the driver and a certificate suitable for this purpose.

To achieve one of the above objects, this invention provides a run efficiency measuring system for a vehicle comprising a first measuring unit arranged to measure investment for the vehicle to run, a second measuring unit arranged to measure actual performance relating to run, a distinguishing unit arranged to distinguish conditions of run, and a processing unit arranged to process the measured investment and the measured actual performance in accordance with the distinguished condition of run.

According to the feature above, the run efficiencies depending on different conditions are separately processed to inform influence of each condition on the run efficiency.

According to a detailed feature of this invention, the distinguishing unit is arranged to identify driver who actually drives the vehicle, and the processing unit is arranged to separately process the measured investment and the actual performance by the driver in response to the distinguishing unit. Accordingly, in a case that a plurality of drivers share the same vehicle, each driver can individually know her or his own run efficiency due to her or his driving skill and tendency, which is a useful information to improve them.

According to a more detailed feature of this invention, the distinguishing unit includes a communicator arranged to communicate with a certificate kept by the driver to read identification data of the driver. Typical example of the certificate capable of such communication is an IC card type certificate. By means of communication between vehicle and certificate according to this feature, the identification of the driver is advantageously carried out for the purpose of separately calculating run efficiency by the driver.

According to another detailed feature of this invention, the distinguishing unit is arranged to distinguish one of toll run and free run from the other, and the processing unit is arranged to separately process the measured investment and the actual performance by toll run and free run, respectively, in response to the distinguishing unit. It is expected in toll run that investment is increased due to the toll in addition to the fuel expense, while the actual performance is improved due to better fuel cost and saved time taken for run. On the other hand, it is expected in free run that investment is saved by avoiding toll road, while the actual performance drops off due to worse fuel cost and longer time caused by a limited traffic capacity. In considering run efficiency, the factor of time may be counted as investment in view of a budget, and on the other hand, as an actual performance in view of saving time which is inevitably taken for doing everything. The above feature of processing the measured investment and the actual performance by toll run and free run, respectively, is advantages for analysis of the relationship of investment-performance efficiency in running on vehicle.

According to a more detailed feature of this invention, the distinguishing unit includes electronic toll system unit arranged to detect getting on and of a toll road. Thus, it is advantageously carried out to distinguish one of toll run and free run from the other.

According to still another detailed feature of this invention, the distinguishing unit is arranged to distinguish unit price of energy fed to the vehicle. Thus, the factor of fuel expense or the like as the investment is suitably taken into consideration in calculating run efficiency. For example, the unit price of energy may be input through a wireless communication at a gas station or the like upon feeding the vehicle.

According to another detailed feature of this invention, the processing unit includes a data creating unit arranged to summarize the measured investment and the measured actual performance every time when a predetermined event occurs. This feature advantageously segments the measured data in response to an occurrence the event to processes the measured investment and the measured actual performance in accordance with the distinguished condition. Typical example of the event is a change in the condition distinguished by the distinguishing unit. Or, alternatively, the event is a change in day. A still another typical example of the event is a detection that predetermined travel distance has been run, which is for avoiding too large capacity of summarization of the measured investment and the measured actual performance.

According to still another detailed feature of this invention, the investment includes cost of energy consumed, toll paid and time taken for performing run. On the other hand, according to another detailed feature of this invention, the performance includes travel distance and time taken for the vehicle to run the travel distance. As has been mentioned above, the factor of time may be counted as investment in view of a budget, and on the other hand, as an actual performance in view of saving inevitable time taken.

This invention also provides a vehicle capable of communicating with a certificate kept by a driver to drive the vehicle comprising a communicator arranged to communicate with the certificate, an identifying unit arranged to identify the driver by means of identification data transmitted from the certificate through the communicator, a processing unit arranged to process the identification data identified by the identifying unit. Typical example of the certificate capable of such communication is an IC card type certificate. The feature of this invention relating to the communicator on the vehicle and the identification of the driver on the data from the certificate provides various advantages due to the communication between vehicle and certificate.

A typical example of the processing unit includes a run efficiency measuring system arranged to measure run efficiency with respect to the identified driver. As has been mentioned above, in a case that a plurality of drivers share the same vehicle, each driver can individually knows and improves her or his driving skill and tendency on the basis of the run efficiency measuring system with driver identified.

Another typical example of the processing unit includes an authenticating unit arranged to authenticate a qualified driver permitted to drive the vehicle. According to this feature, security is improved in various types of usage patterns including share of the same vehicle by a family or limited persons signed in a car sharing system or checking in a rent-a-car system. Further, in the case of an insured vehicle, it is possible for the authenticating unit to check whether or not the nationality and age of the driver identified by the certificate is covered by the terms and condition of the car insurance. If not, it is possible for the authenticating unit to consider the identified driver to be an unqualified person.

According to a detailed feature of the invention above related to a vehicle capable of communicating with a certificate kept by a driver, the processing unit includes an authenticating unit arranged to carry out credit card payment in electronic toll system. In this case, the certificate is authenticated also as a credit card to carry out payment in electronic toll system.

According to another detailed feature of the invention related to a vehicle capable of communicating with a certificate kept by a driver, the vehicle further comprises a slot into which the certificate is to be inserted for communication through the communicator. Thus, the identification of the driver through the communication between the vehicle and the certificate is facilitated and carried out without fail as well as the certificate is kept in a predetermined position in the vehicle without lost due to a process of identification.

This invention also provides a certificate capable of communicating with a vehicle, the certificate being kept by a person who is to drive the vehicle comprising a communicator arranged to communicate with the vehicle, and a memory arranged to store data treated by the communicator.

Typical contents stored in the memory of the certificate are identification data of the person keeping the certificate and credit card data necessary to carry out payment in electronic toll system. Thus, the certificate and credit card registered in electric toll system are advantageously integrated into one card for facilitating various features above relating to the communication between the vehicle and the integrated card.

Another typical content stored in the memory of the certificate is data measured by the vehicle driven by the person and transmitted from the vehicle through the communicator. This means that data measured by the first vehicle is copied by the certificate, which is kept even if the driver gets of the first vehicle originating the data. The data thus copied to the certificate can be uploaded through the communicator into the second vehicle upon the driver keeping the certificate is to drive the second vehicle. Thus, the individual data, such as fuel cost, is taken over from vehicle to vehicle and totally accumulated in the memory of the certificate regardless of vehicles driven by the same driver.

Other features and advantages according to this invention will be readily understood from the detailed description of the preferred embodiments in conjunction with the accompanying drawings.

The detailed description of the preferred embodiments according to this invention includes various detailed features derived from the above mentioned features. However, such detailed features are not only applicable to the above mentioned features, but also are widely and independently applicable to other objects and features. So, the above description should not be deemed to limit the scope of this invention, which should be properly determined on the basis of the attached claims.

BRIEF DESCRIPTION OF THE DRAWINGS

FIG. 3 is a table showing model data for example recorded in data recorder 13 in FIG. 2.

FIG. 4 is a table showing the same model data as in FIG. 3 with modifications made, wherein some data column are omitted and column for cost/10 km run fuel cost and speed which can be calculated on other values are added in italic.

FIG. 5 is a table showing the extraction of toll free run data retrieved from data in FIG. 4 under the condition that value in column of toll/10 km is zero.

FIG. 6 is a table showing the extraction of toll road run data retrieved from data in FIG. 4 under the condition that value in column of toll/10 km is not zero.

FIG. 7 represents a pair of tables showing the extraction run data retrieved from all data in FIG. 4 by the driver, wherein FIG. 7 (A) is for the driver with certificate ID, "123", while FIG. 7 (B) for the driver with certificate ID, "456".

FIG. 8 represents a pair of tables showing the run data extracted from all data in FIG. 4 both with respect to the driver with certificate ID, "123", wherein FIG. 8 (A) is a collection of toll free run data, while FIG. 8 (B) of toll road run data.

DETAILED DESCRIPTION OF THE PREFERRED EMBODIMENT

Embodiment 1

Figure 1:
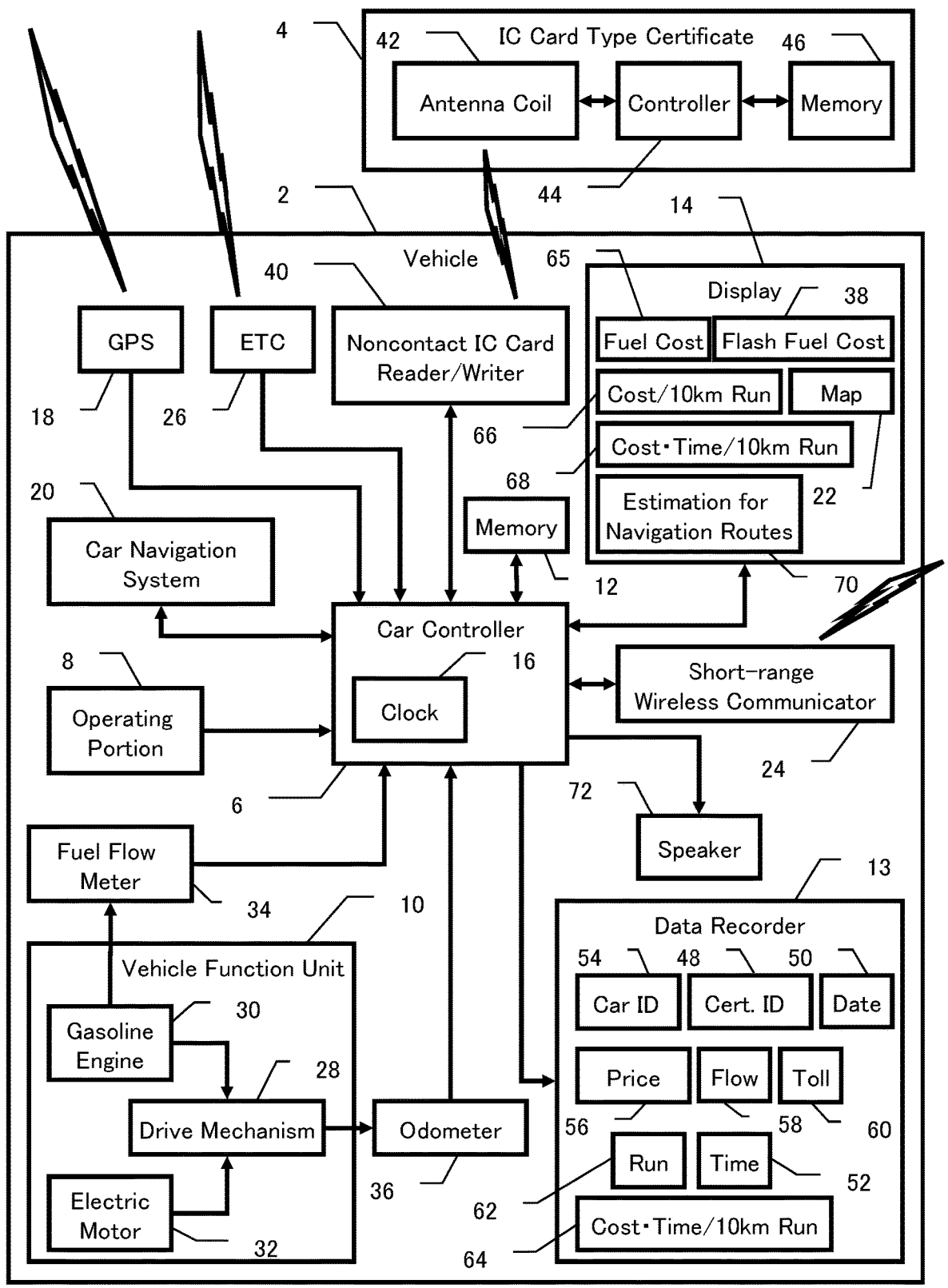
FIG. 1 is a block diagram showing the first embodiment of a run efficiency measuring system according to this invention.

FIG. 1 is a block diagram showing the first embodiment of a run efficiency measuring system according to this invention. The run efficiency measuring system of this invention is mounted on vehicle 2 and serves as a system in cooperation with an IC card type certificate 4. Vehicle 2 in embodiment 2 is shown as a so-called hybrid car powered by both a gasoline engine and electric motor. However, this invention is not limited to be embodied by such a hybrid car, but also is applicable to another type of vehicle such as a conventional gasoline engine car or an electric car.

Vehicle 2 includes car controller 6 having computer for controlling vehicle function unit 10 in response to operating portion 8 operated by a driver. The functions n unit 10 in response to operating portion 8 operated by a driver. The functions of car controller 6 are carried out in accordance with software stored in memory 12. Memory 12 further stores various temporary data necessary for controlling entire vehicle 2. Car controller 6 further controls display 14 for graphic use interface (GUI) in cooperation with operating portion 8 and for indication of the result of control or calculation. Car controller 6 includes clock 16, the clock time of which is utilized in various functions. The clock time of clock is often and automatically set right by means of ratio wave time information outside.

Global positioning system (GPS) unit 18 receives the absolute position information of vehicle 2 including latitude, longitude and altitude from the satellite and the nearest broadcast station according to GPS, which information being sent to car controller 6. Car navigation system unit 20 processes the absolute position information coming from GPS unit 18 by way of car controller 6 to indicate the position of vehicle 2 on map 22 in display 14. Vehicle 2 is also provided with short-range wireless communicator 24 for receiving at gas/electricity filling station or the like the information of unit price and total measure of fuel and electric energy and the charge thereon, the received information being to be stored in data recorder 13 by way of car controller 6. Electronic toll system (ETC) unit 26 receives at toll gate or the like the information of the motorway toll for storage in data recorder 13 by way of car controller 6. Thus, the total cost for run including gas/electric energy payment and toll payment is recorded in data recorder 13.

Here, explanation of flash or instantaneous fuel cost (herein after referred to by "flash fuel cost") will be given. Vehicle function unit 10 comprises gasoline engine 30 and electric motor 32 for generating power to be transmitted to drive mechanism 28 including transmission and wheels. Fuel flow meter 34 measures fuel flow injected into gasoline engine 30 through injection valve to inform car controller 16 of it. Odometer 36 calculates the run of vehicle 2 by multiplying the known diameter of the wheel in drive mechanism 28 by the number of rotations thereof to inform car controller 6 of the calculated run. Thus, car controller 6 calculate the flash fuel cost on the basis of the fuel flow and the run to indicate it at flash fuel cost area 38 in display 14.

IC card type certificate 4 communicates with vehicle 2 through noncontact IC card reader/writer 40 when the keeper of IC card type certificate 4 gets in vehicle 2. In more detail, electric power is induced at antenna coil 42 which receives radio wave from noncontact IC card reader/writer 40. On this electric power, controller 44 reads out data such as certificate ID from memory 46 to send it to noncontact IC card reader/writer 40, and receives data such as fuel cost from noncontact IC card reader/writer 40 to store it into memory 46. The certificate ID can be utilized for adding up fuel cost data individually and personally in vehicle 2 as will be explained later in detail, and also for authenticating a person entitled to drive vehicle 2 as in the second embodiment to be mentioned later.

For the purpose of surely facilitating the communication between IC card type certificate 4 and noncontact IC card reader/writer 40 above, a certificate slot may be preferably provided for insertion of IC card type certificate 4 wherein noncontact IC card reader/writer 40 is located in the certificate slot. It is popular that a credit card slot is provided at ETC unit 26 for paying the toll. So, if IC card type certificate 4 is integrated into the credit card, noncontact IC card reader/writer 40 is to be located in the credit card slot. In this case IC card type certificate and IC card reader/writer may be of contact type. On the other hand, if the IC card type certificate is modified to have own battery to remove the distance limit necessary for electromagnetic induction to generate power, the communication between IC card type certificate and noncontact IC card reader/writer 40 can be successfully carried out when a driver merely gets in vehicle 2 to sit at the driver's seat with the IC card type certificate kept in her or his pocket.

The certificate ID read by noncontact IC card reader/writer 40 from IC card type certificate 4 is recorded in data recorder 13 at certificate ID area 48 by way of car controller 6. Data recorder 13 further includes date are 50 and time area 52 both responsive to clock 16, car ID area for recording data unique to of vehicle 2, price area 56 for recording unit price data received through short-range wireless communicator 24, flow area 58 for data form fuel flow meter 34, toll area 60 for data from ETC unit 26, and run area 62 for run data from odometer 36. Car controller 6 calculate "cost·time/10 km run" as an index of total investment to run, which will be explained later, to record it at cost·time/10 km run area 64.

Car controller 6 makes other various calculations on data recorded in data recorder 13 to indicate the results in display 14 at fuel cost area 65, cost/10 km run area 66, cost·time/10 km run area 68 and estimation for navigation routes area 70 for assisting decision on navigation route. Car controller 6 also controls speaker 72 to have it announce information necessary for the driver.

Figure 2:
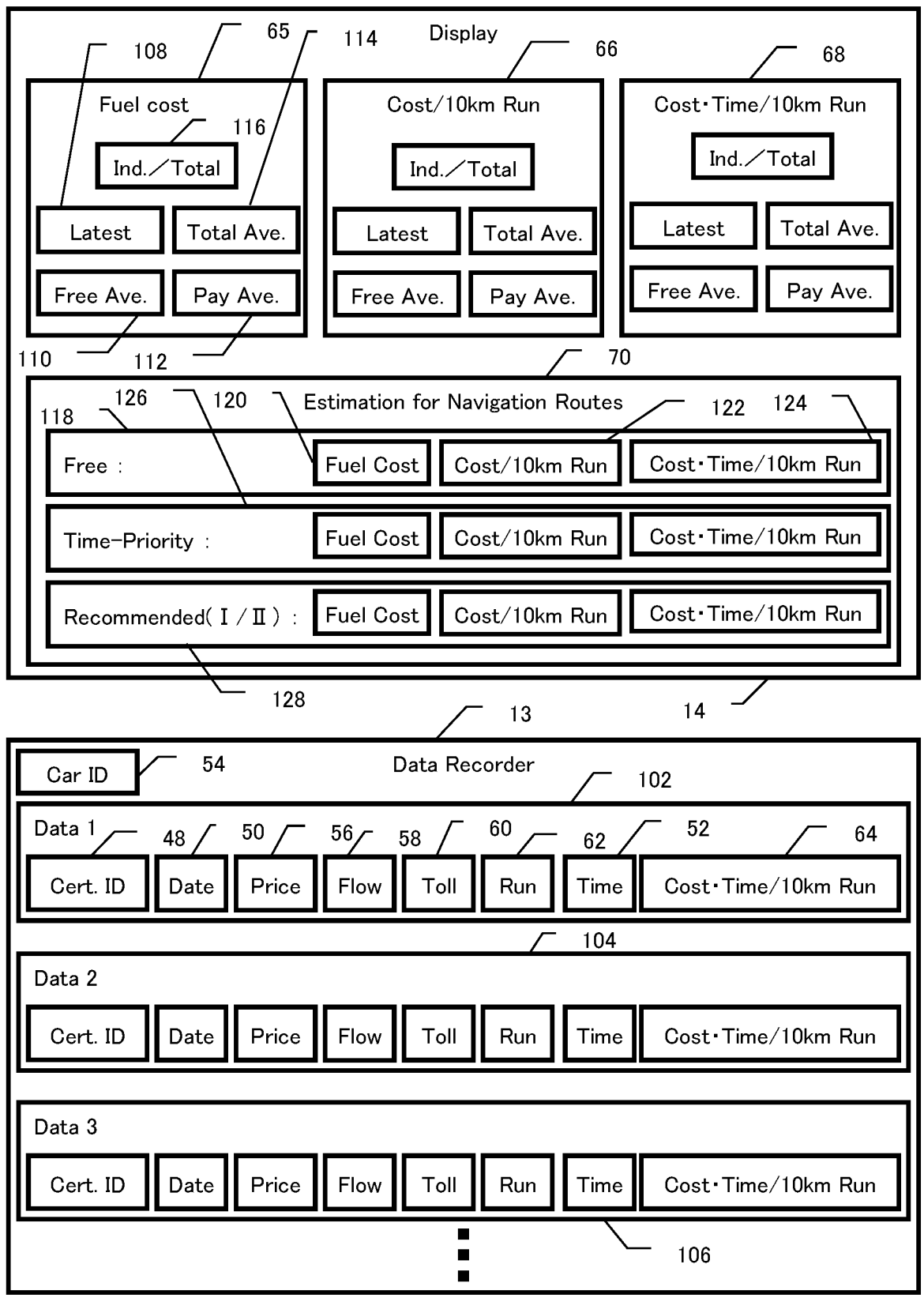
FIG. 2 is a block diagram showing the details of data recorder 13 and display 14 of the first embodiment in FIG. 1.

FIG. 2 is a block diagram showing the details of data recorder 13 and display 14 of the first embodiment in FIG. 1, elements in FIG. 2 same as in FIG. 1 being accompanied with the same numbers, respectively, the explanation thereof are basically omitted. As to data recorder 13, various data other than car ID 54, are divided into data 1 for unit run data area 102, data 2 for unit run data area 104, data 3 for unit run data area 106, etc. The manner of making each unit run data will be explained later. Data 1 for unit run area 102, for example, is of a data structure including certificate ID area 48, date area 50, unit price area 56, flow area 58, toll area 60, run area 62, time area 52 and cost·time/10 km run area 64. Unit run areas 104, 106, etc. each are of the same data structure though the explanation thereof are omitted. Examples of the data will be shown later.

On the other hand, display 14 in FIG. 2 shows details of areas in the display with map area 22 and flash fuel cost area 38, which are shown in FIG. 1, are omitted. Fuel cost area 65 includes latest fuel cost area 108 for the latest average fuel cost calculated on the latest unit run data by the current driver, free average fuel cost area 110 for free average fuel cost calculated on accumulation of the unit run data made on runs with toll road avoided, pay average fuel cost area 112 for pay average fuel cost calculated on accumulation of the unit run data made on runs on toll road, and total average fuel cost area 114 for total average fuel cost calculated on accumulation of free and pay runs.

Further in fuel cost area 65, individual/total distinguishing area 116 is prepared to indicate whether the various averages displayed in free average fuel cost area 110, pay average fuel cost area 112 and total average fuel cost area 114 are for a specific individual or for the total of individuals having driven vehicle 2. The calculation of average for a specific individual is possible through a search for data of the specific driver by certificate ID gotten from IC card type certificate 4 in FIG. 1. In many cases the same single vehicle is possibly driven by a plurality of parsons such as in a car used by a family, in a car sharing by limited persons, or in a rent-a-car system enjoyed by unspecified majority. In such a case, the above feature of individual average calculation is advantageous to pick up fuel cost information only relating to a specific person among data of various persons of different personalities and driving techniques contained in the data recorder of the same car. In other words, even in sharing a car, personal fuel cost information can be gotten to improve personal driving manner and technique favorable to ecology and safety.

Cost/10 km run area 66 and cost·time/10 km run area 68 also have similar latest area, free average area, pay average area, total average area and individual/total distinguishing area, respectively. However, redundant explanation thereof is omitted since the function and meaning is understandable in view of fuel cost area 65.

The "cost/10 km run" indicated in cost/10 km run area 66 means the cost necessary for running 10 km and defined by the following formula:

$$\text{Cost/10 km run} = (\text{Flow} \times \text{Unit cost} + \text{Toll}) \times 10 \text{ km/Run},$$

where the units of quantity for the above values are as follows:
Cost/10 km run: ¥ (Yen);
Flow: ℓ (liter);
Unit cost: ¥ (Yen) ℓ (liter)/;
Toll: ¥ (Yen); and
Run: km (Kilometer).

The "cost·time/10 km run" indicated in cost·time/10 km run area 68 means the cost necessary for running 10 km with time taken for running the same 10 km incorporated. For example, even if cost necessary for running 10 km is the same, the "cost·time/10 km run" will be doubled in the case of double time taken for running the same 10 km. The "cost·time/10 km run" is defined by the following formula, for example:

$$\text{Cost·time/10 km run} = \text{Cost/10 km run} \times \text{Standard speed/Actual average speed},$$

where the units of quantity for the above values are as follows:
Cost·time/10 km run: ¥ (Yen);
Standard speed: km (Kilometer)/h (Hour); and
Actual average speed: km (Kilometer)/h (Hour).

The followings are typical application of the above formula to several simple examples to consider the meaning thereof with the cost kept constant. Firstly, if the actual average speed is a double of the standard speed, the value for cost·time/10 km run becomes a half of that for the standard speed. In other words, investment of cost as well as time for running 10 km with time converted into money is reduced to a half of the standard in this case. In contrast, if the actual average speed is a half of the standard speed, the value for cost·time/10 km run is increased to a double of that for the standard speed. In other words, the investment efficiency with time converted into money is lowered due to the longer time taken because of the lowered speed in this case. On the other hand, if cost is doubled and the actual average speed is also doubled, no change in the value for cost·time/10 km run is caused since the ratio between the standard speed and the actual average speed is converted into money.

The manner of incorporating time factor into investment for run as well as cost factor is not necessarily limited to the above definition, "cost·time/10 km run". However, the above definition is one of intuitive manners of advantageously converting time into money in terms of investment for run. Further, the definition of investment to run is not necessarily limited per 10 km. But, fuel cost is represented by kilometer per liter (in Japan, for example) and 10 km/ℓ is familiar as a conventional divide between good fuel cost and bad fuel cost. So, the above definition is made per 10 km for making the figure intuitively understandable.

For example, if 50 km/h is assigned to the standard speed in the above formula with ¥100/ℓ assigned to the unit cost of fuel, the calculated value for cost·time/10 km run is ¥100 which is a very intuitive standard run model of such meaning that the investment of ¥100 achieves 10 km run of vehicle 2 with a speed of 50 km/h and fuel cost of 10 km/ℓ. And, if speed is lowered to 25 km/h due to a change in traffic, the time taken for running to the goal is doubled, which increases the value for cost·time/10 km run to ¥200 due to only time factor. Further, if the decrease of fuel cost by half naturally accompanies the decrease of speed by half, not only the time factor but also cost factor is doubled to result in ¥400 for the value of cost·time/10 km run.

As in the definition of cost/10 km run above, the cost includes the toll cost as well as the energy cost for fuel or electricity. Accordingly, if vehicle 2 has run for 100 km on a toll road with ¥2,500 paid in a unit run for example, the Cost/10 km run includes ¥250 per 10 km for the toll cost. And, if the fuel cost is 20 km/ℓ and the unit price of fuel is ¥100 per liter, the Cost/10 km run includes ¥50 per 10 km for energy cost. Thus, the total of cost/10 km run is ¥300 for the above unit run. Further, if vehicle 2 has run the at an average speed of 100 km/h through the unit run above, it takes time of a half of the case of run at the standard speed of 50 km/h. Thus, cost·time/10 km run is ¥150 in the above unit run.

On the other hand, if vehicle 2 has run through the same distance with toll road avoided with average speed of 25 km/h and fuel cost of 5 km/ℓ due to low running efficiency in return of toll free, Cost/10 km run is ¥200 due to only the energy cost. Further, it takes time of a double of the case of run at the standard speed of 50 km/h. Thus, cost·time/10 km run is ¥400 in this case of unit run. In this manner, the concept of cost/10 km run is useful in comparing total cost including energy cost and toll cost. The concept of cost·time/10 km run is further useful in comparing the total investment-benefit performance with time converted into money. Thus, these concepts are advantageous to multidimensional estimation or comparison of investment for run, which leads to run of vehicle 2 with improvement of efficiency and decrease of environmental burden taken into consideration.

As has been mentioned, the estimation or comparison of cost or cost·time is not necessarily made per run of 10 km. But, any other intuitive unit distance may be adoptable in accordance with average fuel cost and road environment to be improved in the future or differing from country to country. Similarly, the standard speed is not necessarily limited to 50 km/h, but any other standard speed distance may be adoptable in accordance with the improvement of or the difference in average fuel cost and road environment. Further, the manner of combining cost and time to form an index of estimation or comparison is not necessarily limited to the above explained "cost and time taken for unit run", but any other manner is adoptable, such as "run per unit time and cost spent on it" in view of investment-benefit performance, for example.

In contrast to the above explained areas relating to evaluation of past performance, estimation for navigation routes area 70 in FIG. 2 relates to useful information for decision on future run. In response to an input of a goal, car navigation system unit 20 in FIG. 1 proposes a plurality of possible routes such as a free route with toll road avoided, a highway priority route, the shortest way route, and a time-priority route for selection by the driver, and starts navigation in accordance with the selected route. Estimation for navigation routes area 70 in FIG. 2 is to inform the driver of estimation of fuel cost, cost/10 km run, and cost·time/10 km run for each of the routes on the basis of the past performance and current and anticipated traffic condition for decision by the driver.

Free route area 118 is for informing of various estimations for free route at fuel cost are 120, cost/10 km run area 122, and cost·time/10 km run area 124, respectively. Time-priority route area 126 includes information areas similar to those of free route 118, the explanation of which is omitted for avoiding redundancy. Recommended route area 128 is informing of various estimations for a route in which the value for cost/10 km run or for cost·time/10 km run is minimum. Recommended route area 128 also has indication to identify the case by note I (for the case of minimum cost/10 km run) or note II (for the case of minimum cost·time/10 km run), one of the cases being alternatively selected by the driver.

FIG. 3 is a table showing model data for example recorded in data recorder 13 in FIG. 2, in which data 1 to data 30 are shown with respect a vehicle identified by car ID, "17". Data 1, data 3 to 18 and data 28 relate to a driver identified by certificate ID, "123". Similarly, data 2, data 19 to 23, data 29 and data 30 relate to another driver identified by certificate ID, "456". Data 24 to 27 are of an unidentified driver who keeps a certificate not registered for automatic authentication through noncotact IC card reader/writer 40. The bottom line of the table in FIG. 3 shows totals and run weighted average for various values of data 1 to 30. In more detail, totals are shown for the columns of flow, run and time, respectively, and weighted average is shown for the column of cost·time/10 km (simply denoted by "cost·time"). With respect to units for various values are as follows:

Price: ¥/ℓ (Yen/liter)
Flow: ℓ (liter)
Toll/10 km: ¥ (Yen)
Run km (Kilometer)
Time h (Hour)
Cost·Time/10 km ¥ (Yen)

The unit run for data 1 is automatically ended due to the change in driver from one with certificate ID, "123" to another with certificate ID "456", which automatically starts data 2. Similarly, the unit run for data 2 thus stated is automatically ended due to the change from the driver with certificate ID "456" back to the driver with certificate ID, "123" to start data 3. The transition form the unit run for data 3 to that of data 4 is automatically caused by vehicle 2 going from free way into toll way. The transition form the unit run for data 4 to that of data 5 is automatically caused by vehicle 2 stopping at gas station to feed fuel of unit price, ¥100, which differs from the former unit price ¥120. The transition form the unit run for data 5 to that of data 6 is automatically caused by a rule setting that new unit run data is to be created every run of 100 km. The transition form the unit run for data 6 to that of data 7 is caused by changing into another rule setting that new unit run data is to be created every run of 10 km, the change being done in the course of the former rule before 100 km has not been reached. Each of the transitions caused from the unit run for data 7 to that of data 11 is based on the rule setting that new unit run data is to be created every run of 10 km. The transition form the unit run for data 11 to that of data 12 is automatically caused by vehicle 2 going off toll way into free way, the transition being caused in the course of the rule before 10 km has not been reached. And, the transition form the unit run for data 13 to that of data 14 is automatically caused by the change in date in the course of the unit run of 10 km. Other similar transitions may be easily understood in view of the above explanations.

As in FIG. 3, new unit run data is to be automatically created on every change in the driver, toll, unit price of fuel, setting of run unit and date. And, new unit run data is also automatically created every run of a predetermined distance even if the above mentioned change will not occurs. Though the value for cost·time/10 km run in the last column in FIG. 3 may appear to be calculated anytime on the basis of sums of the related values in other columns according to the definition, the value is calculated for every unit run data to be stored in data recorder 13 since the value for cost·time/10 km is not in linier relationship with each of the related values.

FIG. 4 is a table showing the same model data as in FIG. 3 with modifications made, wherein some data column are omitted and column for cost/10 km run (simply denoted by "Cost"), fuel cost and speed which can be calculated on other values are added in italic. In the model, the values for run are unified into 100 km in data 1 to data 5 for making comparisons among calculated values easy in analysis. Especially, data 1 for a run at speed of 50 km/h with fuel cost of ¥10.0 is an intuitive standard for comparison, in which values for cost/10 km run and cost·time/10 km are both ¥120, which is identical with the value for unit price of fuel, ¥120/ℓ.

In the case of data 2, speed slows into 33.3 km/h and fuel cost gets worse into 8.3 km/ℓ due to a change in traffic, which pushes cost/10 km run up to ¥144. Further, cost·time/10 km is further pushed up to ¥216, which is 1.5 times the cost/10 km run, due to the run time increased by half in comparison with the standard data 1. On the contrary, data 3 is for run on toll free high way at average speed of 100 km/h, in which fuel cost is improved into 16.7 kmkm/ℓ and cost/10 km run is correspondingly saved into ¥72. Further, cost·time/10 km is further saved into ¥36, which is half of the cost/10 km run, due to the run time reduced into half of that in the standard data 1.

Data 4 is for run toll road at average speed of 100 km/h with toll of ¥2,000 paid. In this case, fuel cost is same as that in data 3, which means that energy cost is the same. However, toll is added to the energy cost to cause cost/10 km run of ¥272. However, cost·time/10 km in data 4 is ¥136 due to the run time reduced into half of that in the standard data 1. In other words, cost·time/10 km of ¥136 in data 4 is so improved as to be comparable to that in data 1. And, in comparison with data 2 caused under bad traffic condition, cost·time/10 km in data 4, ¥136 is rather better than that in data 2, ¥216 for all the addition of toll since the time taken in data 4 is one third of that in data 2.

Conventionally, toll is simply and independently considered as an additional payment though the benefit is qualitatively enjoyed. On the contrary, the adoption of "cost/10 km run" makes it possible for the driver to quantitatively evaluate the benefit of the toll with the improvement of fuel cost directly combined with the toll into the form of total money. Further, the adoption of "cost·time/10 km run" makes it possible for the driver to totally evaluate the investment-benefit performance in run with the relation between the travel distance and the taken time quantitatively incorporated in the form of total money. The bottom line of the table in FIG. 4 shows run weighted average for "cost/10 km run", fuel cost, and speed. In contrast to the case of "cost·time/10 km run" in FIG. 3, "cost/10 km run", fuel cost, and speed are in linier relationship with each of the related values to make it easy to calculate them later. So, it is not necessary for values in the italic column shown in FIG. 4 to be stored in data recorder 13.

The run weighted averages shown in bottom line of the table in FIG. 4 are to be indicated at total average area 114 in fuel cost area 65 and similar total average areas in "cost/10 km run" area 66 and "cost·time/10 km run" area 68 in FIG. 2, respectively, with "Total" indicated in individual/total distinguishing area 116 in fuel cost area 65 and similar individual/total distinguishing areas in "cost/10 km run" area 66 and "cost·time/10 km run" area 68, respectively. The values indicated in the total average areas for fuel cost area 65, "cost/10 km run" area 66 and "cost·time/10 km run" area 68 are 14.4 km/ℓ, ¥203 and ¥129, respectively.

FIG. 5 is a table showing the extraction of toll free run data retrieved from data in FIG. 4 under the condition that value in column of toll/10 km is zero. The bottom line of the table in FIG. 5 shows totals and run weighted averages of the extracted data These totals and run weighted averages are to be indicated at free average area 110 in fuel cost area 65 and similar free average areas in "cost/10 km run" area 66 and "cost·time/10 km run" area 68 in FIG. 2, respectively, with "Total" indicated in individual/total distinguishing area 116 in fuel cost area 65 and similar individual/total distinguishing areas in "cost/10 km run" area 66 and "cost·time/10 km run" area 68, respectively. The values indicated in the free average areas for fuel cost area 65, "cost/10 km run" area 66 and "cost·time/10 km run" area 68 are 9.9 km/ℓ, ¥116 and ¥142, respectively.

On the other hand, FIG. 6 is a table showing the extraction of toll road run data retrieved from data in FIG. 4 under the condition that value in column of toll/10 km is not zero. The bottom line of the table in FIG. 6 shows totals and run weighted averages of the extracted data These totals and run weighted averages are to be indicated at pay average area 112 in fuel cost area 65 and similar pay average areas in "cost/10 km run" area 66 and "cost·time/10 km run" area 68 in FIG. 2, respectively, with "Total" indicated in individual/total distinguishing area 116 in fuel cost area 65 and similar individual/total distinguishing areas in "cost/10 km run" area 66 and "cost·time/10 km run" area 68, respectively. The values indicated in the pay average areas for fuel cost area 65, "cost/10 km run" area 66 and "cost·time/10 km run" area 68 are 18.5 km/ℓ, ¥245 and ¥123, respectively.

By means of comparing values in free average area 110 and pay average area 112 in fuel cost area 65 gotten in the manner explained above, the difference between the two kinds of fuel cost can be quantitatively understood. In the model shown in FIGS. 5 and 6 above, it is quantitatively understood that the fuel cost is better in toll road run with higher average speed than in toll free run as expected. Similarly, by means of comparing values in the free average area and the pay average area in "cost/10 km run" area 66 also gotten in the manner explained above, the relationship between decrease in energy cost due to the improved fuel cost and the increase of pay due to the toll can be quantitatively understood. Further, by means of comparing values in the free average area and the pay average area in "cost·time/10 km run" area 68 gotten in the manner explained above, the investment-benefit performance with time factor is taken into consideration can be quantitatively understood. In the model shown in FIGS. 5 and 6 above, it is quantitatively understood that the "cost·time/10 km run" is more economical in toll road run than in toll free run.

FIG. 7 (A) is a table showing the extraction run data of the driver with certificate ID, "123" from all data in FIG. 4. The bottom line of the table in FIG. 7 (A) shows totals and run weighted averages of the extracted data. During the individual with certificate ID, "123" is driving vehicle 2, these totals and run weighted averages are to be indicated at total average area 114 in fuel cost area 65 and similar total average areas in "cost/10 km run" area 66 and "cost·time/10 km run" area 68 in FIG. 2, respectively, with "individual" indicated in individual/total distinguishing area 116 in fuel cost area 65 and similar individual/total distinguishing areas in "cost/10 km run" area 66 and "cost·time/10 km run" area 68, respectively. The values indicated in the total average areas for fuel cost area 65, "cost/10 km run" area 66 and "cost·time/10 km run" area 68 are 15.0 km/ℓ, ¥212 and ¥117, respectively.

On the other hand, FIG. 7 (B) is a table showing the extraction run data of the driver with certificate ID, "456" from all data in FIG. 4. The bottom line of the table in FIG. 7 (B) shows totals and run weighted averages of the extracted data. During the individual with certificate ID, "456" is driving vehicle 2, these totals and run weighted averages are to be indicated at total average area 114 in fuel cost area 65 and similar total average areas in "cost/10 km run" area 66 and "cost·time/10 km run" area 68 in FIG. 2, respectively, with "individual" indicated in individual/total distinguishing area 116 in fuel cost area 65 and similar individual/total distinguishing areas in "cost/10 km run" area 66 and "cost·time/10 km run" area 68, respectively. The values indicated in the total average areas for fuel cost area 65, "cost/10 km run" area 66 and "cost·time/10 km run" area 68 are 8.2 km/ℓ, ¥165 and ¥209, respectively, in the case of the individual with certificate ID, "456".

By means of comparing various run weighted average values between FIG. 7 (A) and FIG. 7 (B), the difference in driving skill and tendency between the driver with certificate ID, "123" and the driver with certificate ID, "456", who both drives the same vehicle 2. In more detail according to the values in FIGS. 7 (A) and 7 (B) derived from the model data in FIG. 3, the driver with certificate ID, "123" achieves average run with better fuel cost than the driver with certificate ID, "456". Of course, this is due to the frequent runs through toll road as is apparent from the comparison of values in "cost/10 km run". However, the comparison of values in "cost·time/10 km run" shows that the driver with certificate ID, "123" achieves clearly better investment-benefit performance than the driver with certificate ID, "456" finally.

FIG. 8 (A) is a table showing the extraction of toll free run data relating to only the driver with certificate ID, "123". The bottom line of the table in FIG. 8 (A) shows totals and run weighted averages of the extracted data. During the individual with certificate ID, "123" is driving vehicle 2, these totals and run weighted averages are to be indicated at free average area 110 in fuel cost area 65 and similar free average areas in "cost/10 km run" area 66 and "cost·time/10 km run" area 68 in FIG. 2, respectively, with "individual" indicated in individual/total distinguishing area 116 in fuel cost area 65 and similar individual/total distinguishing areas in "cost/10 km run" area 66 and "cost·time/10 km run" area 68, respectively. The values indicated in the free average areas for fuel cost area 65, "cost/10 km run" area 66 and "cost·time/10 km run" area 68 are 11.5 km/ℓ, ¥99 and ¥100, respectively.

On the other hand, FIG. 8 (B) is a table showing the extraction of toll road run data relating to only the driver with certificate ID, "123". The bottom line of the table in FIG. 8 (B) shows totals and run weighted averages of the extracted data. During the individual with certificate ID, "123" is driving vehicle 2, these totals and run weighted averages are to be indicated at pay average area 112 in fuel cost area 65 and similar pay average areas in "cost/10 km run" area 66 and "cost·time/10 km run" area 68 in FIG. 2, respectively, with "individual" indicated in individual/total distinguishing area 116 in fuel cost area 65 and similar individual/total distinguishing areas in "cost/10 km run" area 66 and "cost·time/10 km run" area 68, respectively. The values indicated in the pay average areas for fuel cost area 65, "cost/10 km run" area 66 and "cost·time/10 km run" area 68 are 17.2 km/ℓ, ¥261 and ¥124, respectively.

If the individual run weighted average values for fuel cost, "cost/10 km run" and "cost·time/10 km run" in FIGS. 8 (A) and 8 B) both for the driver with certificate ID, "123" are compared with corresponding total run weighted average values in FIGS. 5 and 6, respectively, the individual free averages are 11.5 km/ℓ, ¥99 and ¥100, respectively, in contrast to the total free averages, 9.9 km/ℓ, ¥116 and ¥142, respectively. Similarly, the individual pay averages are 17.2 km/ℓ, ¥261 and ¥124, respectively, in contrast to the total pay averages, 18.5 km/ℓ, ¥245 and ¥123, respectively. Thus, it can be concluded that the driver with certificate ID, "123" performs clearly better run than the total average on free road, while dose slightly worse run than the total average on pay road.

Figure 9:
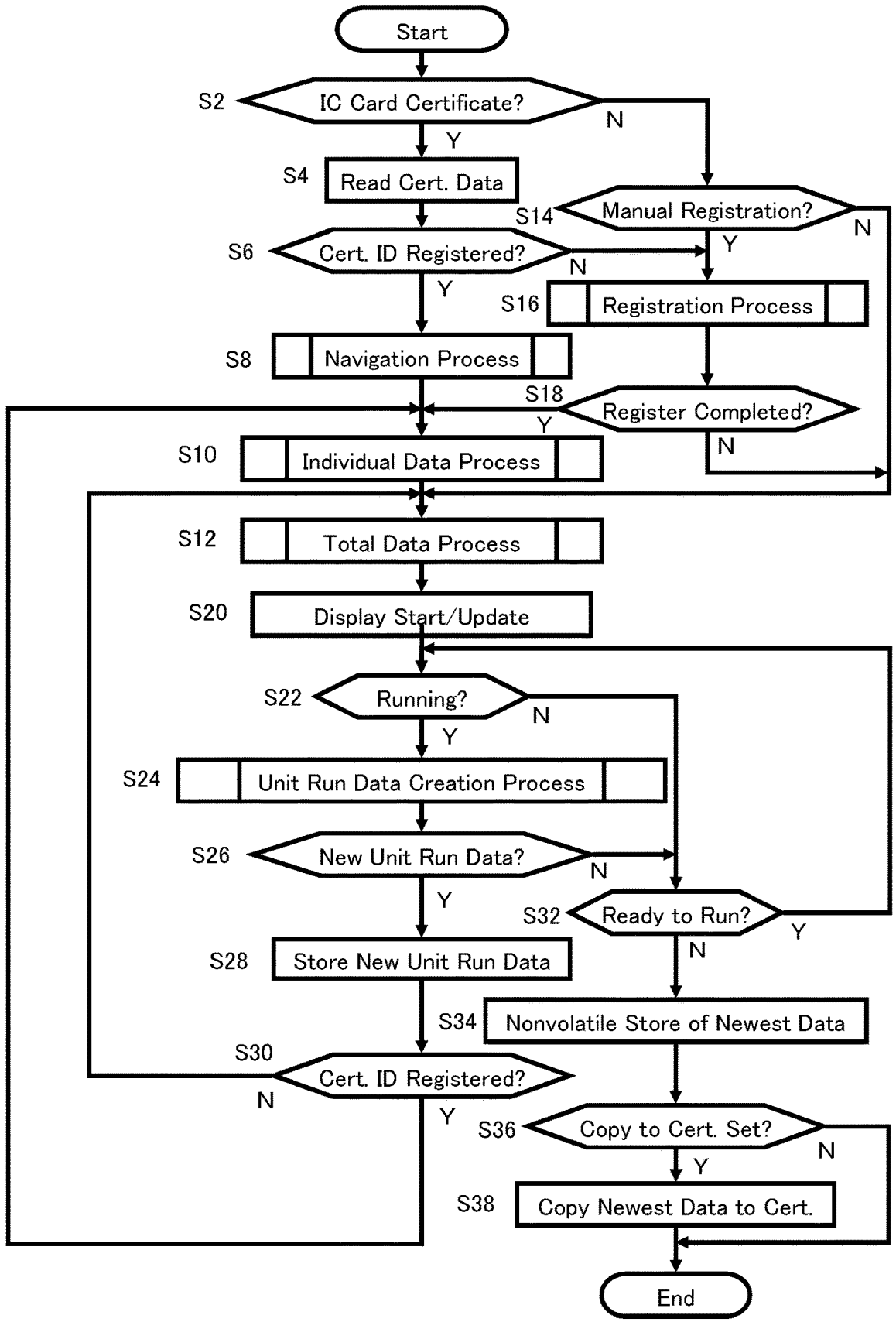
FIG. 9 is a basic flowchart showing the function carried out by car controller 6 in FIG. 1.

FIG. 9 is a basic flowchart showing the function carried out by car controller 6 in FIG. 1. The flowchart starts when vehicle 2 becomes ready to run. For example, the flow starts with the ignition in the on position in the case of a gasoline engine car, or the flow starts with the electric switch for ready to run in the on position in the case of an electric car or a so-called hybrid car. If the flow starts, it is checked in step S2 whether or not the certificate kept by the driver is of the IC card type. In the case of a vehicle with a certificate slot, the check in step S2 is carried out by accessing to the certificate having been inserted into the slot before the vehicle becomes ready to run. Or, in the case of available wireless communication range for accessing the certificate, the check in step S2 is carried out if the driver merely gets in vehicle to sit at the driver's seat with the certificate kept in her or his pocket and makes the vehicle ready to run.

If it is confirmed in step 2 that the certificate is of the IC card type, the flow goes to step S4 to read out the certificate data form the confirmed certificate. And, in step S6 it is checked whether or not the read certificate data is identical with that of a certificate which has already registered. In the case of already registered certificate, the flow goes from step S6 to step S8 to carry out navigation process, the details of which will be explained later. Following the navigation process, the individual data process is carried out in step S10 and the total data process is further carried out in step S12, the details of these processes being explained later.

On the other hand, if it is not confirmed in step S2 that the certificate is of the IC card type, the flow goes to step S14 to check whether or not a predetermined manner of manual operation is made for registering a certificate. If such a manual operation is detected, the flow goes to step 16 to carryout registration process, the details of which will be explained later. Further, if it is not determined in step S6 that the read certificate data is identical with that of a certificate which has already registered, the flow goes to step S16. This flow from step S6 to step S16 is caused by a driver with an IC card type certificate drives vehicle 2 for first time. Upon completion of the registration process in S16, the flow advances to step s18 to check whether or not the registration of certificate ID has been successfully completed. If the completion is confirmed the flow goes to step S10 since individual data process is possible. On the contrary, if the completion is failed to be confirmed in step S18, the flow goes step S12. Further, if the predetermined manner of manual operation for registering certificate ID is not detected in step S14, the flow directly goes to step S12.

Upon completion of total data process in step S12, the flow goes to step S20 to instruct display 14 to start display, or to update display in accordance with the result of step S10 and/or step S12 if the display has been started. Next in step S22, it is checked whether or not vehicle 2 is running. If running condition is determined in step S22, the flow goes to step 24 to carry out unit run data creation process, the details of which is explained later.

Upon completion of unit run data creation process in step 24, the flow goes to step S26 to check whether or not a new unit run data is created. If a new unit run data is detected in step S26, the flow goes to step S28 to store the new unit run data to go to step 30. In step S30, it is checked the certificate data is registered to return to step S10 if registered or to step S12 if not registered. Thus, the flow loop of step 10 and/or step S12 and the succeeding steps leading to step S20 are repeated to accumulate unit run data created in step S24 unless running condition is failed to be detected in step S22.

If running condition is failed to be detected in step S22, the flow goes to step S32. If a new unit run data is not detected in step S26, the flow also goes to step S32. In step S32, it is checked whether or not vehicle 2 is ready to run. If the vehicle 2 is determined to be ready to run in step S32, the flow returns to step 22 to repeat steps 22, and steps S22 and S32 are repeated in the case of vehicle 2 stopping and ready to run for waiting for next run to advance to the steps led by step S24.

On the other hand, if it is not determined in step S32 that vehicle 2 is ready to run, the flow goes to step S34 to store the newest data into data recorder 13 at a nonvolatile area in case of possible shut down of the power. Further, in step S36 it is checked in step S36 that such a setting is done that the data in data recorder 13 is copied to memory 46 of IC card type certificate 4. And, if the copy setting is determined in step S36, the flow goes to step S38 to carry out the copy of the newest individual data relating to the certificate ID to memory 46 of IC card type certificate 4, then the flow going to the end. On the other hand, if the copy setting is not determined in step S36, the flow directly goes to the end. The individual newest data copied to IC card type certificate 4 is to be uploaded into a second vehicle upon the driver keeping the certificate is to drive the second vehicle for updating the similar data recorder of the second vehicle if the certificate is also registered in the second vehicle. Thus, the individual data, such as fuel cost, is taken over from vehicle to vehicle and totally accumulated in memory 46 of IC card type certificate 4 regardless of vehicles driven by the same driver.

Figure 10:
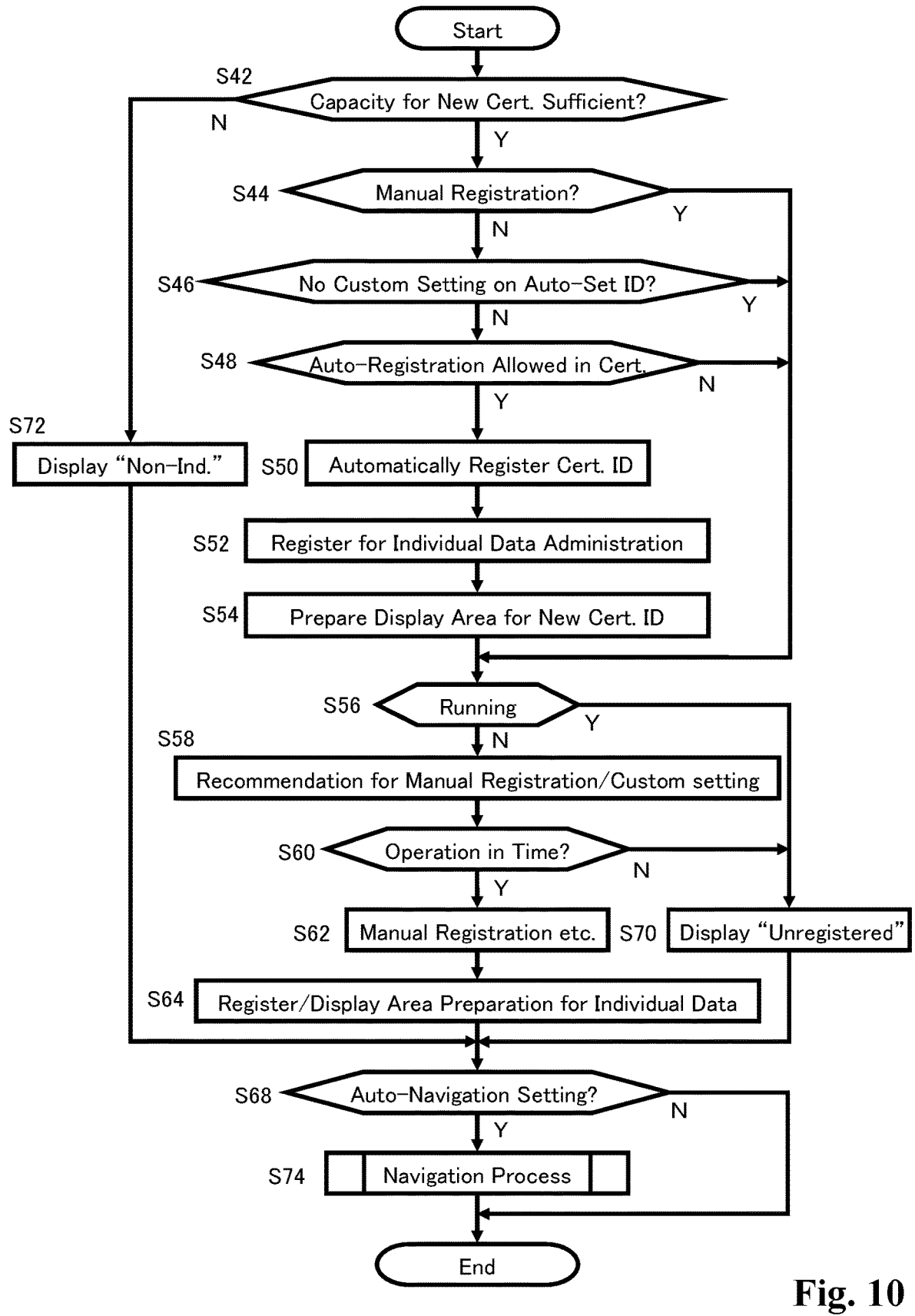
FIG. 10 is a flowchart showing the detailed function of the registration process in step S16 in FIG. 9.

FIG. 10 is a flowchart showing the detailed function of the registration process in step S16 in FIG. 9. If the flowchart starts, it is checked in step S42 whether or not capacity in vehicle 2 is sufficient for individual data administration on a new certificate. If the capacity is sufficient, the flow goes from step S42 to step S44 to check whether or not the registration is to be made manually. In other words, step S44 checks whether or not step S16 is reached by way of step S14.

If it is not determined in step S44 that the registration is to be made manually, the flow advances to step S46 since it means that step S16 is reached by way of step S6 in accordance with a first drive by a driver with IC card type certificate not completely registered yet. In step S46, it is checked whether or not the IC card type certificate is in a condition that the ID has been automatically registered, but custom setting has not been registered yet. If it is determined in step S46 that the IC card type certificate is not in the condition above, the flow goes to step S48 to check whether or not IC card type certificate 4 is in such a setting condition as to allow the automatic registration. The automatic setting allowance is determined in step S48, the flow goes to step S50 to carry out the automatic registration of certificate ID, and further register the certificate ID for individual data administration in step S52. Next, in step S54, a new display area for the newly registered certificated ID is prepared, the flow then going to step S56.

On the other hand, if it is determined in step S44 that the registration is to be made manually, the flow directly goes to step S56. Further, if it is determined in step S46 that the IC card type certificate is in a condition that the ID has been automatically registered, but custom setting has not been registered yet, the flow directly goes to step S56. The flow also directly goes to step S56 if it is not determined in step S48 that IC card type certificate 4 is in such a setting condition as to allow the automatic registration.

In step S56, it is checked whether or not vehicle 2 is running. If it is confirmed in step S56 that vehicle 2 is not running, the flow goes to step S58 to making a recommendation display for manual ID registration or for custom setting possible in the case of automatic ID registration. If appropriate manual operation is detected in step S60 within a period of time after the recommendation display made in step S58, the flow goes to step S62 to carry out the manual registration/custom setting. Further, in step S64, registration of the certificate ID for individual data administration and preparation of a new display area for the newly registered certificated ID are done from the manual operation detected in step S60, the flow then going to step S68.

On the other hand, if it is confirmed in step S56 that vehicle 2 is running, the flow goes to step S70 to display notifying that "the registration has not been done", the flow then going to step S68. This is for inhibiting recommendation for registration or custom setting in step S58 and succeeding manual operation to be detected in step S60 during vehicle 2 is running on the view point of safety to avoid any undesirable traffic accident, the flow then going to step S68. Similarly, if appropriate manual operation is not detected in step S60 within a period of time after the recommendation display made in step S58, the flow goes to step S68 by way of step S70. Further, if it is not determined in step S42 that capacity in vehicle 2 is sufficient for individual data administration on a new certificate, the flow goes to step S72 to make display noting that "the individual administration is not possible", the flow then going to step S68.

In step S68, it is checked whether or not automatic navigation setting is done to go into navigation process in step S74, the flow going to the end upon completion of the navigation process. On the other hand, if it is not determined that the automatic navigation setting is done, the flow directly go to the end. The navigation process in step S74 is identical with the navigation process in step 8 in FIG. 9, the details of which will be explained later as has been already mentioned.

Figure 11:
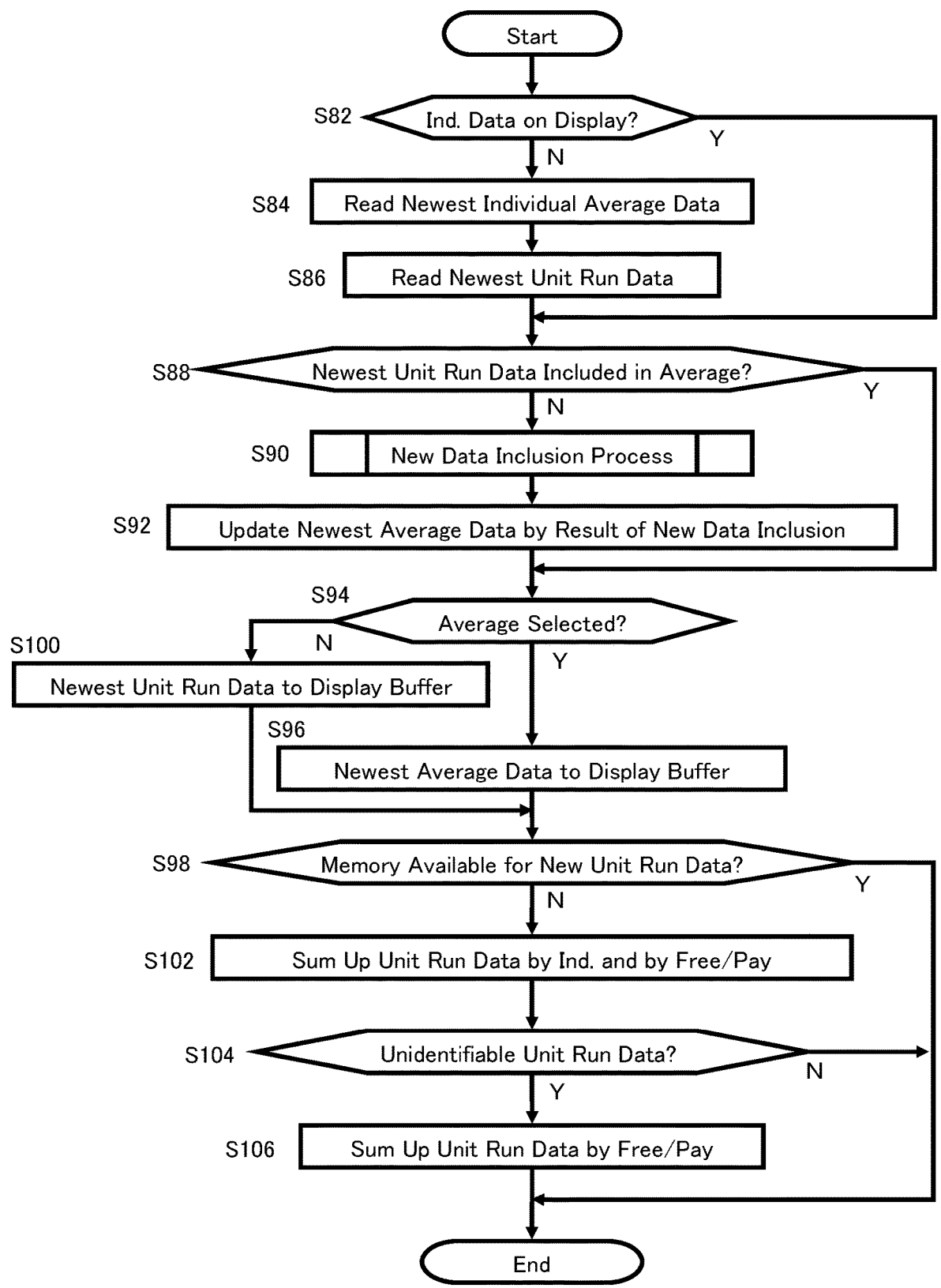
FIG. 11 is a flowchart showing the detailed function of the individual data process in step S10 in FIG. 9.

FIG. 11 is a flowchart showing the detailed function of the individual data process in step S10 in FIG. 9. If the flowchart starts, it is checked in step S82 whether or not the individual data is now on display. If not, the newest individual run weighted average data are read out in step S84 and the newest unit run data is read out in succeeding step S86, the flow then going to step S88. On the other hand, if it is determined in step S82 that the individual data is now on display, the flow then directly going to step S88.

In step S88, it is checked whether or not the newest unit run data is included in the run weighted averages. If not, the flow goes to step S90 to carry out the newest unit run data inclusion process, the details of which will be explained later. Further, in step S92, the newest individual run weighted average data by the result of the new data inclusion process in step S90, the flow then going to step S94. On the other hand, if it is confirmed in step S88 that the newest unit run data has been included in the run weighted averages, the flow directly goes to step S94.

In step S94, it is checked whether or not the run weighted average is selected for display. If the selection of run weighted average is confirmed in step S94, the flow goes to step S96 to transfer the run weighted average data to the display buffer of display 14, the flow then going to step S98. On the other hand, if it is not confirmed in step S94 that the run weighted average is selected for display the flow goes to step S100 to transfer the newest unit run data as it is to the display buffer of display 14 since the unit run data display is considered to be requested in this case, the flow then going to step S98.

In step S98, it is checked whether or not memory capacity in data recorder 13 is still available for a coming new unit run data. If not, the flow goes to step S102 to sum up a considerable number of the older unit run data by individual and by the difference between free run and pay run for the purpose of decreasing the number of unit run data to secure the memory capacity for coming new unit run data. Further, in step S104, it is checked whether or not a plurality of unit run data with the related individual unidentifiable exist. If there exist such unidentifiable data, the flow goes to step S106 to sum up the older unidentifiable unit run data by only the difference between free run and pay run, the flow then going to the end.

According to steps S104 and S106 above, even in unidentifiable unit run data assignable to no one can be summed up for decreasing the number of unit run data to secure the memory capacity for coming new unit run data. On the other hand, if it is confirmed in step S98 that memory capacity in data recorder 13 is still available for a coming new unit run data, or if it is confirmed in step S104 that no unidentifiable unit run data exists, the flow directly goes to the end.

Figure 12:
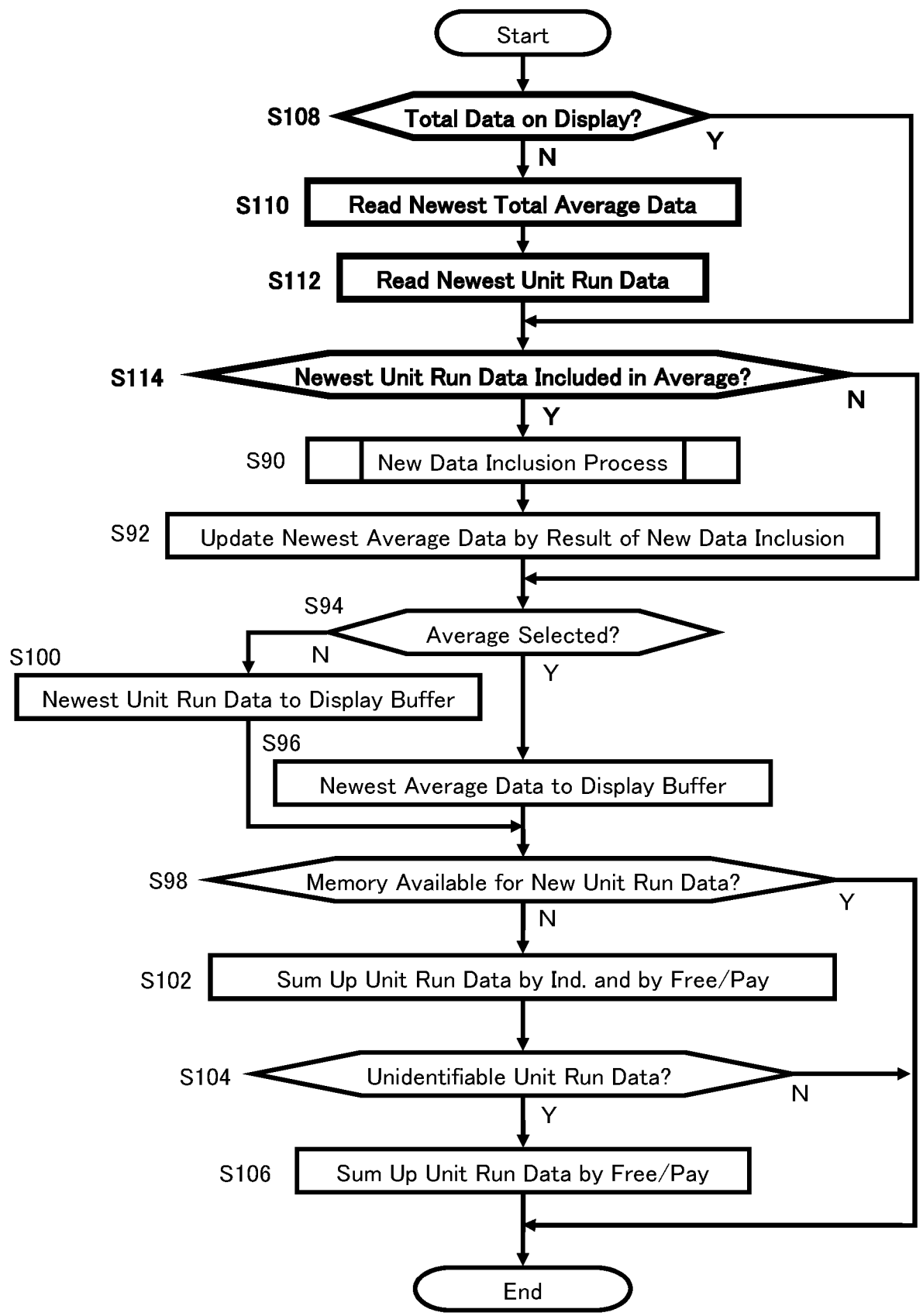
FIG. 12 is a flowchart showing the detailed function of the total data process in step S12 in FIG. 9.

FIG. 12 is a flowchart showing the detailed function of the total data process in step S12 in FIG. 9. The flow in FIG. 12 is basically similar to that in FIG. 11. Namely, if the flowchart starts, it is checked in step S108 whether or not the total data is now on display. If not, the newest total run weighted average data are read out in step S110 and the newest unit run data is read out in succeeding step S112, the flow then going to step S114. On the other hand, if it is determined in step S108 that the total data is now on display, the flow then directly going to step S114.

In step S114 which is similar to step S88 in FIG. 11, it is checked whether or not the newest unit run data is included in the run weighted averages. Steps S90 to S106 following step S114 in FIG. 12 are similar to steps in FIG. 11 following step S88 in FIG. 11 except that the data treated in those steps in FIG. 12 are total averages in place of individual averages. Therefore, the same step numbers are adopted for the steps in FIG. 12 as those in FIG. 11 with explanation thereof omitted.

As has been understood, steps in FIG. 12 correspond to the details of step S12 in FIG. 9 and succeed step S10 in FIG. 9, the details of which is carried out by steps in FIG. 11. Nevertheless, the flow in FIG. 12 includes steps S98 to S106 which are identical with the steps of the same numbers in FIG. 11, respectively. The reason of this seeming redundancy is as follows. Namely, step S12 can be reached by way of step S14 or step S18 in addition to step S10. So, there is a possibility for step S12 to be reached by way of step S14 or step S18 with no available capacity left for new unit run data. Step 98 in FIG. 12 functions to detect such a possibility to have succeeding steps in FIG. 12 deal with the full capacity problem. On the other hand, if step S12 in FIG. 9 is reached by way of step S10 with the full capacity having been solved, the flow in FIG. 12 instantly ends from step S98, which causes no malfunction.

Figure 13:
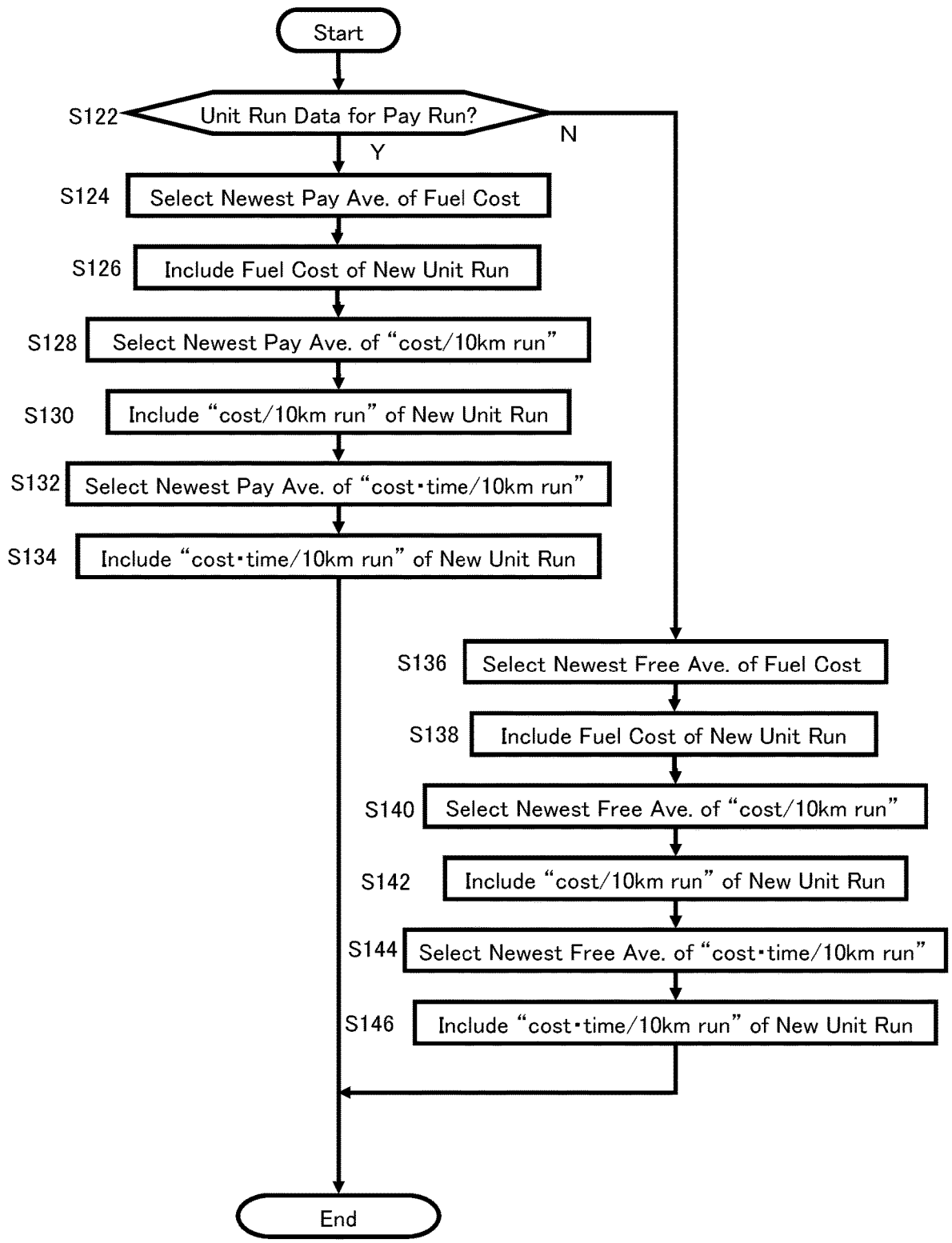
FIG. 13 is a flowchart showing the detailed function of the new data inclusion process in step S90 in both FIG. 11 and FIG. 12.

FIG. 13 is a flowchart showing the detailed function of the new data inclusion process in step S90 in both FIG. 11 and FIG. 12. If the flowchart starts, it is checked in step S122 whether or not the new unit run data is of pay run on toll road. If the unit run data is of pay run, the flow goes to step S124 to select the data of newest run weighted average of fuel cost with respect to pay run. And, in the succeeding step S126, the fuel cost of the new unit run data is included into the newest average of fuel cost with respect to pay run selected in step S124.

Similarly, the data of newest run weighted average of "cost/10 km run" with respect to pay run is selected in step S128. And, in the succeeding step S130, the "cost/10 km run" of the new unit run data is included into the newest average of "cost/10 km run" with respect to pay run selected in step S128. Further, in step S132, the data of newest run weighted average of "cost·time/10 km run" with respect to pay run is selected. And, in the succeeding step S134, the "cost·time/10 km run" of the new unit run data is included into the newest average of "cost·time/10 km run" with respect to pay run selected in step S134, the flow then going to the end.

On the other hand, if it is it is not determined in step S122 that new unit run data is of pay run on toll road, the flow goes to steps lead by step S136 since the new unit run data is of free run. In detail, in step S136, the data of newest run weighted average of fuel cost with respect to free run is selected. And, in the succeeding step S138, the fuel cost of the new unit run data is included into the newest average of fuel cost with respect to free run selected in step S136. Similarly, the data of newest run weighted average of "cost/10 km run" with respect to free run is selected in step S140. And, in the succeeding step S142, the "cost/10 km run" of the new unit run data is included into the newest average of "cost/10 km run" with respect to free run selected in step S140. Further, in step S144, the data of newest run weighted average of "cost·time/10 km run" with respect to free run is selected. And, in the succeeding step S146, the "cost·time/10 km run" of the new unit run data is included into the newest average of "cost·time/10 km run" with respect to free run selected in step S144, the flow then going to the end.

Figure 14:
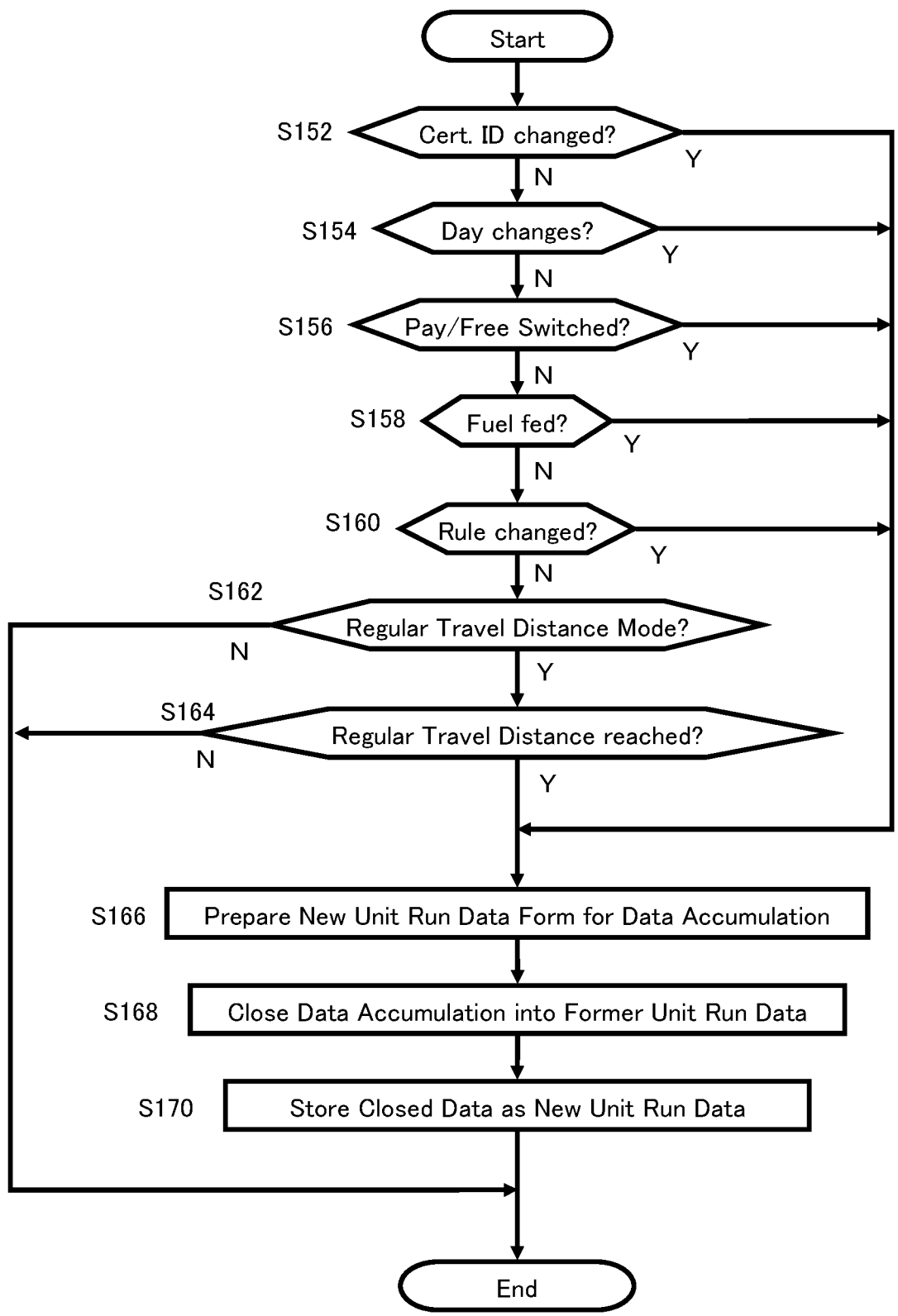
FIG. 14 is a flowchart showing the detailed function of the unit run data creation process in step S24 in FIG. 9.

FIG. 14 is a flowchart showing the detailed function of the unit run data creation process in step S24 in FIG. 9. If the flowchart starts, it is checked in step 152 whether or not certificate ID is changed due to the change in driver of vehicle 2. If not, the flow goes to step S154 to check whether or not day changes. If not, the flow goes to step S156 to check whether or not a switch between pay run and free run is caused by getting on or off the toll road. If not, the flow goes to step S158 to check whether or not vehicle 2 is fed fuel for reacting possible change in fuel cost. If not, the flow goes to step S160 to check whether or not mode and/or rule setting is changed as to creation of new unit run data by every regular travel distance, such as 10 km or 100 km.

If the rule change is not detected in step S160, the flow goes to step S162 to check whether or not regular travel distance mode is set to create new unit run data by every regular travel distance. If the regular travel distance mode setting is detected in step S162 the flow advances to step S164 to check whether or not the regular travel distance is reached after the present run data accumulation was started. If it is determined in step S164 that the regular travel distance is reached, the flow goes to step S166 to prepare a new unit run data form into which data accumulation is started. And at the same time in step S168, the data accumulation into the former unit run data is closed. Further, in step S170 the accumulation closed unit run data is stored into data recorder 13 as the newest unit run data, the flow then going to the end.

The above is a case that new unit run data is created in response to the regular travel distance is reached. However, the series of steps from S166 to S170 to create the new unit run data also results when certificate ID change is detected in step S152, or when day change is detected in step S154, or when pay/free switch is detected in step S156, or when fuel feed is detected in step S158, or when rule change is detected in step S160. On the other hand, if the regular travel distance mode setting is not detected in step S162, the flow directly goes to the end since it is finally concluded that the current data accumulation is to be continued without creating new unit run data form preparation. Further, if it is determined in step S164 that the regular travel distance has not been reached yet in the regular travel distance mode running, the flow directly goes to the end.

Figure 15:
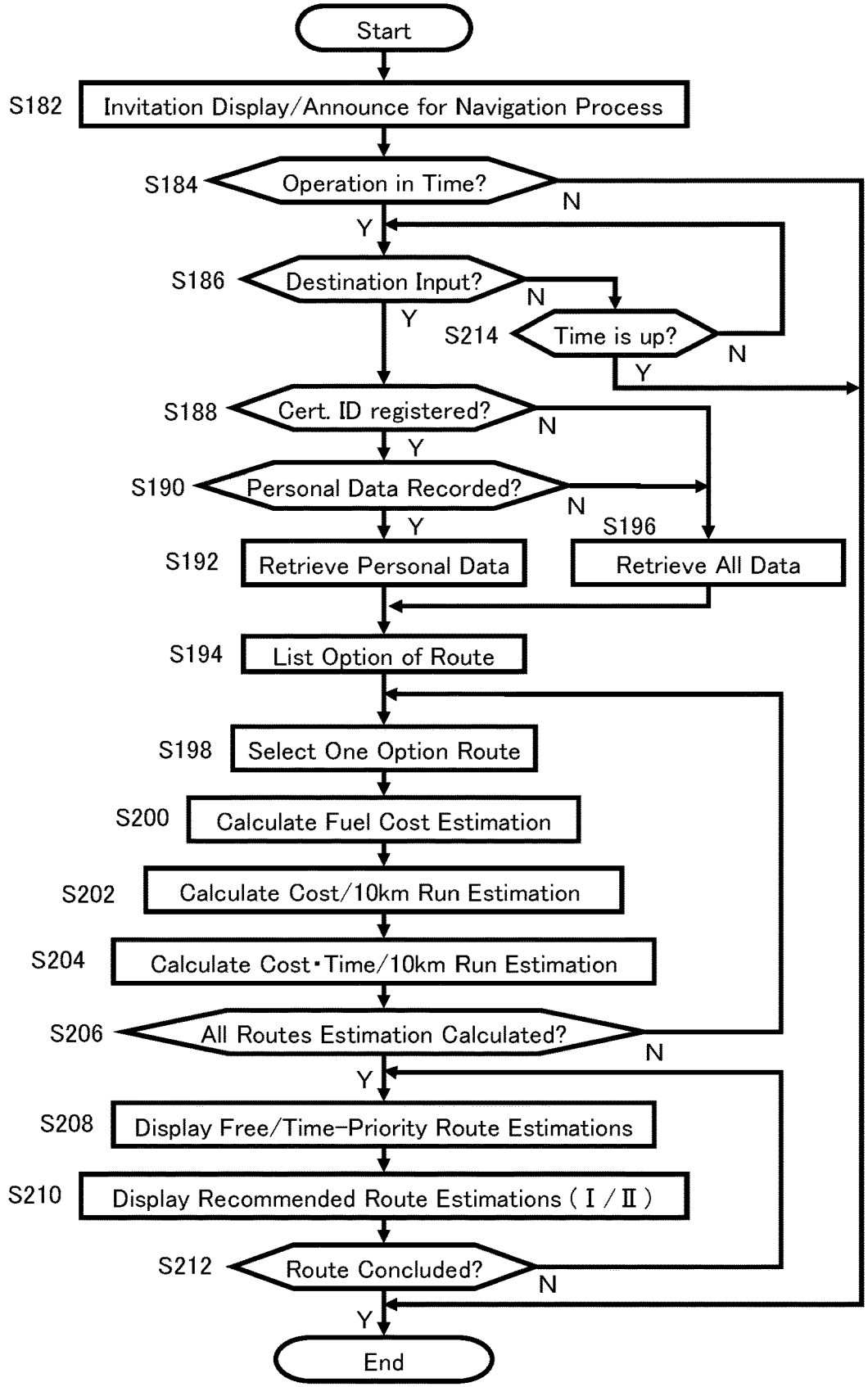
FIG. 15 is a flowchart showing the detailed function of the navigation process in step S8 in FIG. 9 and step S74 in FIG. 10.

FIG. 15 is a flowchart showing the detailed function of the navigation process in step S8 in FIG. 9 and step S74 in FIG. 10. Further, the flow in FIG. 15 can also function in response to a manual operation to use the navigation system. If the flowchart starts, invitation display and/or announce is made in step S182 for starting navigation process. If appropriate manual operation is detected in the following step S184 within a period of time after the invitation display/announce made in step S182, the flow goes to step S186 to check whether or not a destination is input.

If it is determined in step S186 that a destination is input, the flow goes to step S188 to check whether or not certificate ID has been registered. If registered, the flow goes to step 190 to check whether or not personal data relating to the driver identified by the certificate ID is recorded in data recorder 13. If any personal data is recorded, the flow goes to step S192 to retrieve the personal data, the flow then going to step S194. On the other hand, if it is not confirmed in step S188 that certificate ID has been registered, or if it is not confirmed in step S190 that personal data is recorded, the flow goes to step S196 to retrieve all data in the data recorder 13 regardless of the driver identification, the flow then going to step S194. The data retrieved in step S192 or step S196 is utilized in the following steps for listing options of route and estimating fuel cost or the like with respect to the option routes.

In step S194, a plurality of possible and reasonable options of route are listed, one of which is automatically selected according to a predetermined rule in step 198. Then, fuel cost estimation is calculated in step S200 on the basis of data retrieved in step S192 or step S196. Next in step 202, cost/10 km run estimation is calculated on the basis of data retrieved in step S192 or step S196. Further in step 204, cost·time/10 km run estimation is calculated on the basis of data retrieved in step S192 or step S196. Following the above steps, it is checked in step S206 whether or not the estimations for all routes have been calculated. If not, the flow goes back to step 198 to select next one of left option routes for calculation. Thus, the loop of steps S198 S206 is repeated until estimations for all routes have been calculated.

On the other hand if it is determined in step S206 that the estimations for all routes have been calculated, the flow goes to step S208 to direct the display of estimations for free route and time-priority routes, which display correspond to those in areas 118 and 126 in FIG. 2, respectively. Further in step S210, estimation for the recommended route is directed to be displayed in the view points of cost/10 km run and cost·time/10 km run, which display correspond to those in area 128 in FIG. 2, in which one of the recommended routes in the view points of cost/10 km run and cost·time/10 km run is alternatively displayed with identification of which recommendation is displayed. After the above directions to display, the flow goes to step S212 to check whether or not the selection of route is concluded by a driver operation to end the flow if the conclusion of route selection is determined. According to the route thus concluded, the navigation is started by car navigation system 20 in FIG. 1.

On the other hand, if it is not detected in step S212 that t the selection of route is concluded, the flow goes back to step S208 to continue the display of the recommended route estimations. Thus, the steps S208 and S210 are repeated unless the route is concluded. And, during the repetition above, the display according to step S210 can be switched between the recommendation in the view point of cost/10 km run and that of cost·time/10 km run. If appropriate manual operation is not detected in step S184 within a period of time after the invitation display/announce made in step S182, the flow instantly goes to the end. Thus, if no navigation process is intended, the navigation process in step S8 in FIG. 9 or step S74 in FIG. 10 is promptly and automatically terminated to advance to the next step with no operation required. Further, if it is not detected in step S184 that a destination is input, the flow goes to step 214 to check whether a predetermined waiting time is up without destination input. As long as the waiting time has not been up, the flow goes back to step 186 to wait for the destination input with steps S186 and S214 repeated. On the other hand, if it is detected in step S214 that the predetermined time is up the flow instantly goes to the end.

Embodiment 2

Figure 16:
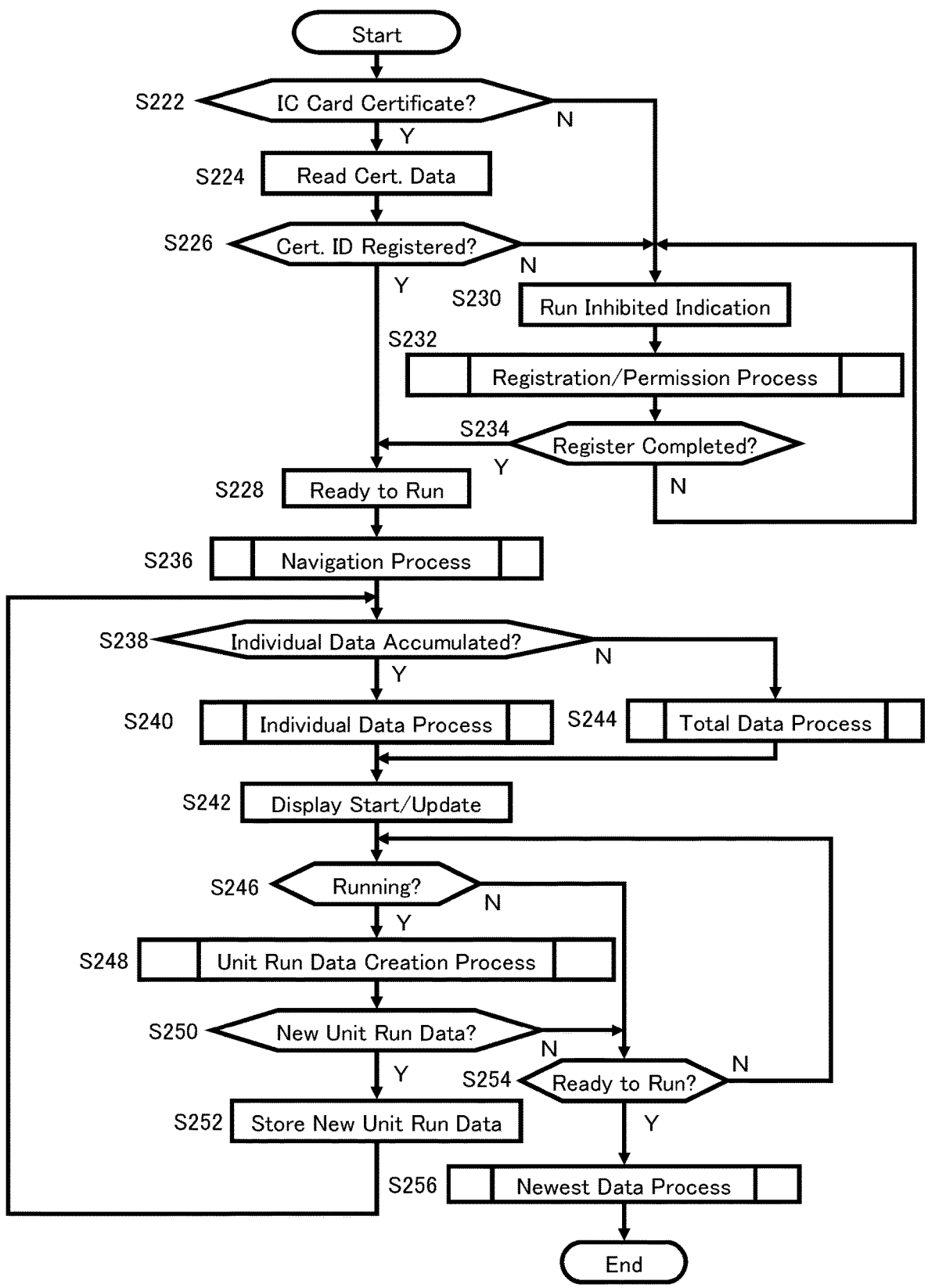
FIG. 16 is a basic flowchart showing the function carried out by car controller 6 in the second embodiment of a run efficiency measuring system according to this invention.

FIG. 16 is a basic flowchart showing the function carried out by car controller 6 in the second embodiment of a run efficiency measuring system according to this invention. The construction of vehicle 2 according to the second embodiment is similar to that of the first embodiment, which can be understood by utilizing FIGS. 1 and 2 accordingly. The difference between the first and second embodiments is the manner of making vehicle 2 ready to run. Namely, the flowchart of the first embodiment in FIG. 9 starts when vehicle 2 becomes ready to run in response to the ignition or the electric switch turned to the on position. In contrast, in the case of the flowchart of the second embodiment in FIG. 16, mere the turning of ignition or the electric switch to the on position is not sufficient to making vehicle 2 ready to run though the flow in FIG. 16 itself is started by the turning on. But, vehicle 2 is made ready to run only by a successful authentication of the IC card type certificate. In other words, the vehicle cannot be driven by an unqualified person having no IC card type certificate to be appropriately authenticated. Thus, security is improved against a theft of the vehicle.

In detail, upon the start of the flow, it is checked in step S222 whether or not the certificate kept by the driver is of the IC card type as in the case of FIG. 9. If it is confirmed in step 222 that the certificate is of the IC card type, the flow goes to step S224 to read out the certificate data form the confirmed certificate. And, in step S226 it is checked whether or not the read certificate data is identical with that of a certificate which has already registered, which means the authentication of the driver permitted to drive vehicle 2. And, if it is confirmed in step S226 that the read certificate data is identical with that of a certificate which has already registered, the flow goes to step S228 to make vehicle 2 ready to run.

On the other hand, if it is not confirmed in step 222 that the certificate is of the IC card type, the flow goes to step S230. If it is not confirmed in step S226 that the read certificate data is identical with that of a registered certificate, the flow also goes to step S230. In step S230, a direction to make display/announcement for informing the driver that the run is inhibited. And the flow goes to step S232 for registration/permission process. The registration/permission process in step S232 cannot be not carried out at liberty to an unregistered driver by itself, but can be carried out under the control of some qualified person or the like such as the owner of vehicle 2, or an administrator of a car sharing organization keeping vehicle 2, or a clerk of a rent-a-car company holding vehicle 2. A permanent registration or a temporary permission registration in case of rent-a-car or the like with respect to a new certificate of the IC card type is done under the control of the above mentioned qualified person or some automatic machine of the similar reliable function controlled by the qualified organization.

32, regardless of successful or not, the flow goes to step s234 to check whether or not the registration/permission of certificate ID has been successfully completed. If the completion is confirmed the flow goes to step S228. On the contrary, if the completion is failed to be confirmed in step S234, the flow goes back to step S230 to continue the run inhibited indication. Thus, the loop of steps 230 to S234 is repeated to inhibit the flow to reach step S228 unless the new certificate is successfully registered through registration/permission process 232, which means that the vehicle cannot be driven. The repetition of the loop of steps S230 to S234 can be cancelled by an appropriate interruption instruction. As has been briefly mentioned, the registration/permission process in step S232 is not only terminated by a successful registration, but is terminated by cancellation in the way of registration process or some error caused in the process according to a predetermined termination rule.

After vehicle 2 is made ready to run in step S228, the flow goes to step S8 to carry out navigation process, which is similar to step S8 in FIG. 9. Following the navigation process, it is checked in step S238 whether or not individual data is accumulated in vehicle 2. If the individual data accumulation is detected in step S238, the flow goes to step S240 to carry out the individual data process, the flow then going to step S242. On the other hand, if the individual data accumulation is not detected in step S238, the flow goes to step S244 to carry out the total data process, the flow then going to step S242. The individual data process in step S240 and the total data process in step S244 is similar to the individual data process in step S10 and the total data process in step S12 in FIG. 9, respectively.

The steps S242 to S252 are similar to steps S20 to S28, respectively, the explanation of which is omitted accordingly. In the case of the flowchart in FIG. 19, however, the flow returns from step S252 upon completion of the data store therein to step S238 to repeat the loop of steps 238 to S252 unless it is determined in step S246 that running is terminated or it is not detected in step S250 that new unit run data is created. Further, in the case of FIG. 16, there is no possibility of run without registration of certificate, which is reflected in the flowchart having no step such as step S30 in FIG. 9. Step S254 is similar to step S32 in FIG. 9, the explanation of which is omitted accordingly. Finally, the newest data process in step S256 is similar to the functions of group of steps S34 to S38, the explanation of which is omitted accordingly.

Embodiment 3

Figure 17:
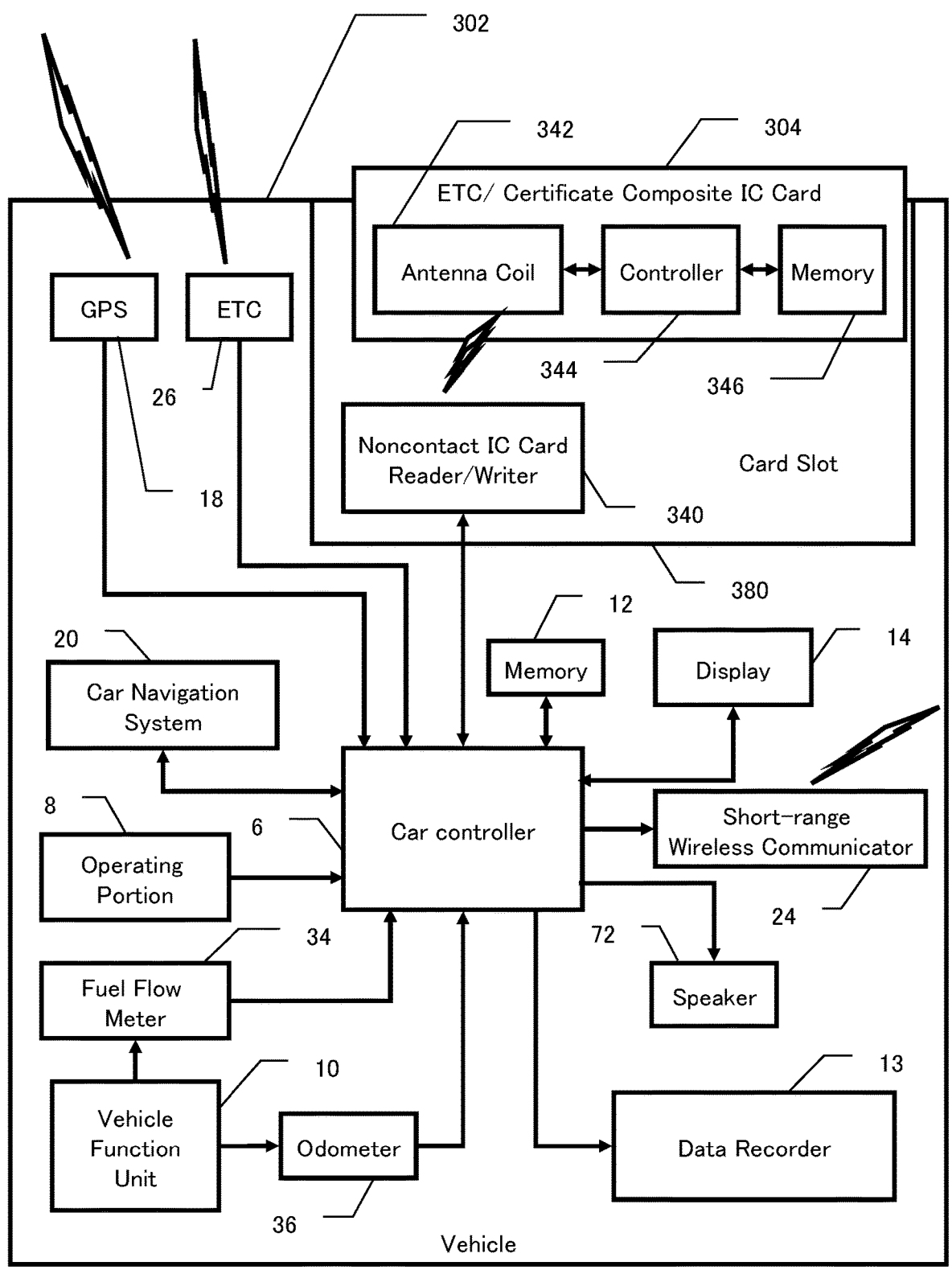
FIG. 17 is a block diagram showing the third embodiment of a run efficiency measuring system according to this invention.

FIG. 17 is a block diagram showing the third embodiment of a run efficiency measuring system according to this invention. The third embodiment is characterized in that vehicle 302 is provided with card slot 380 for coping with the use IC card type certificate 304 integrated into the credit card for payment in ETC system (herein after referred to as "ETC/Certificate composite IC card"). ETC/Certificate composite IC card 304 in FIG. 17 includes antenna coil 342, controller 44 and memory 346, which are basically similar to the corresponding elements in IC card type certificate 4 in FIG. 1. It should be noted, however, memory 346 further stores data as credit card necessary for payment in ETC system and controller 344 has additional function as the credit card since IC card type certificate 304 is integrated into the credit card for payment in ETC system in contrast to IC card type certificate 4 in FIG. 1 without ETC card function.

Card slot 380 includes noncontact IC card reader/writer 340 under control of car controller 6 for transmitting to and receiving from ETC/Certificate composite IC card 304 various data relating to certificate as in the first embodiment as well as various data relating to credit care payment in ETC system. Car controller 6 carries out communication with ETC/Certificate composite IC card 304 through noncontact IC card reader/writer 340 and with outside ETC system such as toll gate through ETC unit 26 or short-range wireless communicator 24.

The various features of the third embodiment in FIG. 17 relating to ETC/Certificate composite IC card 304 and card slot 380 are also applicable to the first and second embodiment. Other elements in the third embodiment in FIG. 17 are similar to the correspond element having the same numbers, the explanations of which are omitted. Further, in FIG. 17, the details of car controller 6, vehicle function unit 10, data recorder 13 and display 14 are omitted for the purpose of simplification. However, the details the elements are similar to those in the first embodiment in FIG. 1.

The various features of this invention disclosed in various embodiments above are not necessarily limited to the embodiments itself, but are widely applicable to other embodiments. For example, in the case or the third embodiments in FIG. 17, ETC/Certificate composite IC card 304 is of noncontact type. However, the adoption of card slot 380 makes it possible to modify one of the embodiments into a modified embodiment including contact type IC card as the ETC/Certificate composite IC card or IC card type Certificate. In this case, the IC card reader/writer 340 to be located in card slot 380 is of contact type.

Further, in the third embodiment, the card to be inserted into card slot 380 is ETC/Certificate composite IC card 304. However, an adoption of separate IC card type certificate and ETC credit card in the third embodiment are possible. In such a case, IC card type certificate is firstly inserted into card slot 380 upon starting the drive, and is removed from card slot 380 with authentication having been successfully completed. And ETC credit card is to be inserted into card slot 380 in place of IC card type certificate.

Or in such a modification that reader/writer 340 in card slot 380 is noncontact/contact composite type, one of the IC card type certificate and ETC credit card may be of noncotact type and the other is of contact type. Further, in a case of card slot 380 is provided with separate noncontact IC card reader/writer and contact IC card reader/writer, one of the IC card type certificate and ETC credit card of noncotact type and the other of contact type can be inserted into card slot 380 simultaneously. In any case, card slot 380 is utilized to accept both IC card type certificate and ETC credit card, which simplifies the manner for the driver to insert one card or two cards relating to two functions.

The identification of the driver by means of reading data stored in the IC card type certificate according to this invention is advantageous in the following modification of the embodiment. Namely, by means of storing property data such as nationality and age of the driver in memory 46 of IC card type certificate 4 or in memory 346 of ETC/certificate composite IC card 304, such property data can be read and advantageously utilized by vehicle 2 or vehicle 302. For example, the data of nationality and age is utilized to check whether or not the driver of the nationality and age is covered by the terms and condition of the car insurance effected on vehicle 2 or vehicle 302. If not, the driver is considered to be an unqualified person.

What is claimed is:

1. A vehicle communication system between vehicles and electronic vehicle license identifications comprising;
   a first electronic vehicle license identification of a first driver including a first memory storing first identification data of the first driver, first credit card data and first license data for the first driver to operate vehicles;
   a first vehicle including:
      a first electronic communicator in communication with the first electronic vehicle license identification,
      a first identifier of the first driver in the first vehicle by means of the first identification data received from the first memory of the first electronic vehicle license identification in communication with the first electronic communicator,
      a first payment controller of electronic payment based on the first credit card data in communication with the first electronic communicator, and
      a first communication controller transmitting information of the first vehicle to the first memory of the first electronic vehicle license identification through the first electronic communicator,
   wherein the first memory of the first electronic vehicle license identification stores the information of the first vehicle in communication with the first electronic communicator as well as information of a second vehicle in communication with a second electric communicator of the second vehicle.

2. The vehicle communication system according to claim 1, wherein the first electronic vehicle license identification and the first electronic communicator are of noncontact type, respectively.

3. The vehicle communication system according to claim 1, wherein the first electronic vehicle license identification and the second electronic communicator are of noncontact type, respectively.

4. The vehicle communication system according to claim 1, wherein the electronic payment system makes electronic payment of Electronic Toll Collection system.

5. The vehicle communication system according to claim 1, wherein the electronic payment system makes electronic payment of cost for gas/electric energy.

6. A vehicle communicating with a first electronic vehicle license identification of a first driver and with a second electronic vehicle license identification of a second driver comprising:
   an electronic communicator in communication with one of the first and second electronic vehicle license identifications, the first electronic vehicle license identification having a first memory storing first identification data of the first driver, first credit card data and first license data for the first driver to operate vehicles, and the second electronic vehicle license identification having a second memory storing second identification data of the second driver, second credit card data and second license data for the second driver to operate vehicles;
   an identifier of the first and second drivers by means of one of the first and second identification data received from one of the first and second memories of the first and second electronic vehicle license identifications in communication with the electronic communicator;
   a payment controller of electronic payment based on one of the first and second credit card data in communication with the electronic communicator; and
   a communication controller transmitting information of the vehicle both to the first and second memories of the first and second electronic vehicle license identifications through the electronic communicator, respectively.

7. The vehicle according to claim 6, wherein the electronic payment system makes electronic payment of Electronic Toll Collection system.

8. The vehicle according to claim 6, wherein the electronic payment system makes electronic payment of cost for gas/electric energy.

9. The vehicle according to claim 6, wherein the electronic communicator and the first and second electronic vehicle license identifications are of noncontact type, respectively.

10. An electronic vehicle license identification of a driver communicating with a first vehicle having a first electronic communicator and with a second vehicle having a second electronic communicator comprising:
    a memory storing identification data of the driver, credit card data and license data for the driver to operate vehicles;
    a third electronic communicator transmitting the identification data of the driver, the credit card data and the license data from the memory to the first and second vehicles in communication with the first and second electronic communicators, respectively, and receiving information of the first and second vehicles in communication with the first and second electronic communicators, respectively; and
    a storage controller storing the information of the first and second vehicles, respectively, received though the third electronic communicator into the memory.

11. The electronic vehicle license identification according to claim 10, wherein the first, second and third electronic communicators are of noncontact type, respectively.

12. The electronic vehicle license identification according to claim 10, wherein the credit card data is of electronic payment of Electronic Toll Collection system.

13. The electronic vehicle license identification according to claim 10, wherein the credit card data is of electronic payment of cost for gas/electric energy.

* * * * *